(12) United States Patent
Rohrauer et al.

(10) Patent No.: US 8,190,288 B2
(45) Date of Patent: May 29, 2012

(54) METHOD AND POSITION REGULATING DEVICE FOR CONTROLLING THE OPERATION OF A LOAD BEARING APPARATUS, BASED ON TWO DIMENSIONS

(75) Inventors: Markus Rohrauer, St. Florian (AT); Rainer Obwaller, Wels (AT)

(73) Assignee: TGW Mechanics GmbH, Wels (AT)

( * ) Notice: Subject to any disclaimer, the term of this patent is extended or adjusted under 35 U.S.C. 154(b) by 822 days.

(21) Appl. No.: 11/885,684

(22) PCT Filed: Mar. 2, 2006

(86) PCT No.: PCT/AT2006/000091
§ 371 (c)(1),
(2), (4) Date: Oct. 9, 2008

(87) PCT Pub. No.: WO2006/094322
PCT Pub. Date: Sep. 14, 2006

(65) Prior Publication Data
US 2009/0062957 A1 Mar. 5, 2009

(30) Foreign Application Priority Data

Mar. 7, 2005 (AT) .................................. A 383/2005
Mar. 18, 2005 (AT) .................................. A 460/2005

(51) Int. Cl.
*G06F 7/00* (2006.01)
(52) U.S. Cl. ........................ 700/230; 212/273
(58) Field of Classification Search .......... 700/213–230; 414/282, 277, 279, 286, 807, 660; 212/270, 212/272–275; 312/35, 36; 194/216–218; 235/376; 340/5.1–5.92; 701/1–13, 19–22, 701/51–69, 71–98, 103–109; 707/600–812; 708/200–212, 492–493, 517, 525, 603, 854; 712/300

See application file for complete search history.

(56) References Cited

U.S. PATENT DOCUMENTS 4,428,708 A * 1/1984 Burt ............................... 414/275
(Continued)

FOREIGN PATENT DOCUMENTS

DE 43 30 795 3/1995
(Continued)

OTHER PUBLICATIONS

International Search Report.
(Continued)

*Primary Examiner* — Gene Crawford
*Assistant Examiner* — Kyle Logan
(74) *Attorney, Agent, or Firm* — Collard & Roe, P.C.

(57) ABSTRACT

The invention describes a method and a position control system (22″) for controlling operation of a computer-controlled load handling device, with a displacement drive for a displacement unit, a lift drive for a vertically displaceable lifting unit and an actuator drive for a loading and unloading device, and a computer predefines a target position for the displacement and lifting units and loading and unloading device and controls the travel to it. Time-minimized reference trajectories are set first of all, optimized with respect to the maximum permissible loads of the load handling device and with respect to the displacement between the start and target positions, and from these, the desired trajectories are calculated for desired positioning forces ($F_{xsoll}$, $F_{ysoll}$, $F_{zsoll}$) of the displacement and lifting units and the loading and unloading. The displacement, lifting and actuator drives receive the desired positioning forces ($F_{xsoll}$, $F_{ysoll}$, $F_{zsoll}$) in timed cycles and are controlled by them as they move along the desired trajectories, and dynamic deformations of the load handling device which occur during the acceleration and deceleration phase are reduced to zero by the instant the deceleration phase ends on the basis of the desired trajectories during the automatic control operation.

22 Claims, 15 Drawing Sheets

U.S. PATENT DOCUMENTS

| | | | | |
|---|---|---|---|---|
| 4,766,547 | A | * | 8/1988 | Modery et al. ............... 700/229 |
| 5,170,863 | A | * | 12/1992 | Devroy ......................... 187/224 |
| 5,659,470 | A | * | 8/1997 | Goska et al. ................... 701/35 |
| 5,699,281 | A | * | 12/1997 | Crucius et al. ................ 702/159 |
| 5,798,920 | A | * | 8/1998 | Crucius et al. .................. 700/66 |
| 5,816,366 | A | * | 10/1998 | Briday et al. ................. 187/224 |
| 5,838,572 | A | * | 11/1998 | Hofstetter et al. ............ 700/213 |
| 6,226,558 | B1 | | 5/2001 | Schneider et al. |
| 6,409,451 | B1 | * | 6/2002 | Fallin et al. ................... 414/282 |
| 7,920,961 | B2 | * | 4/2011 | Mandel et al. ................ 701/200 |
| 2001/0020197 | A1 | * | 9/2001 | Nakano et al. ................ 700/215 |
| 2003/0185656 | A1 | | 10/2003 | Hansl |
| 2004/0111339 | A1 | * | 6/2004 | Wehrung et al. ............... 705/30 |
| 2004/0197172 | A1 | * | 10/2004 | Hansl et al. ................... 414/281 |
| 2004/0216957 | A1 | * | 11/2004 | Hansl et al. ................... 187/247 |

FOREIGN PATENT DOCUMENTS

| | | |
|---|---|---|
| DE | 195 34 291 | 3/1997 |
| DE | 196 41 192 | 3/1998 |
| DE | 100 64 182 | 5/2002 |
| EP | 0 806 715 | 11/1997 |
| JP | 09-272606 | 10/1997 |
| JP | 11-301815 | 11/1999 |
| WO | WO 03/004385 | 1/2003 |

OTHER PUBLICATIONS

English translation of International Preliminary Report on Patentability.

Torsten Wey, Markus Lemmen: "Flachheitsbasierte Regelung—Folgeregelung eines hydraulischen Differentialzylinders," 1997, Forschungsbericht Nr. Nov. 1997, Gerhard-Mercator Universtität. XP-002395713. (ISR) (Discussed in the specification—see Preliminary Amendment).

Rothfuss, Ralf et al., "Flachheit: Ein neuer Zugang zur Steuerung and Regelung nichtlinearer Systeme," Regelungs-Technische Praxis, R. Oldenbourg Verlag GmbH, Munchen, DE, No. 45, 1997. XP-001247434. (ISR) (Discussed in the specification—see Preliminary Amendment).

Rudolph, Joachim et al., "Flachheitsbasierte Steuerung eines Timoshenko-Balkens," Zamm Z. Angew. Math. Mech, vol. 83, No. 2, Jan. 2003, pp. 119-127. XP-002395711. (ISR) (Discussed in the specification—see Preliminary Amendment).

* cited by examiner

METHOD AND POSITION REGULATING DEVICE FOR CONTROLLING THE OPERATION OF A LOAD BEARING APPARATUS, BASED ON TWO DIMENSIONS

CROSS REFERENCE TO RELATED APPLICATIONS

This application is the National Stage of PCT/AT2006/000091 filed on Mar. 2, 2006 which claims priority under 35 U.S.C. §119 of Austrian Application No. A 383/2005 filed on Mar. 7, 2005 and Austrian Application No. A 460/2005 filed on Mar. 18, 2005. The international application under PCT article 21(2) was not published in English.

The invention relates to a method of controlling the movement of a computer-controlled load handling device using flatness based control, a position control system and a load handling device.

Increasing pressure to reduce costs and improve performance demands a technically economic optimization of racking operating equipment, especially the displacement and lifting drives, including their control, because apart from pure design criteria, these represent a significant factor in terms of dynamic behavior. Allowance needs to be made for the fact that the cycle times of the lifting and displacement drives are made up of periods of pure motion and periods when vibrations of the mast caused by acceleration and deceleration are being damped, for example. If the mast is vibrating, the transfer of the freight object from the lifting unit onto the bay compartment can not proceed straight away, due to a potential risk of damage. In effect, it is necessary to wait until the amplitude has been damped to a threshold value. From this, it is evident that dynamic behavior has a crucial effect on throughput rates and hence the economic viability of a high-bay racking system. Satisfying the demand for increased throughput rates on the basis of higher accelerations and speeds is therefore not an option because this would unavoidably result in higher vibration amplitudes and longer damping times. This therefore leads to longer cycle times in spite of having reduced the movement time. In order to solve this optimization problem involving such contradictory objectives, the displacement and lifting drives of known bay operating systems are incorporated in an automatic control circuit with a view to reducing the damping time of vibrations at the mast.

In the past, attempts have also been made to detect vibrations generated at the mast or the mast deflection or curvature of the mast in the deflected state by means of a measuring sensor and incorporate the measurement values in a controller of a position control system for the displacement and lifting drives in order to adapt the desired positioning force of the displacement and lifting drives across the entire operating path to whatever operating mode is prevailing. In addition to the conventional position control circuit, another option is a closed automatic control circuit, by means of which vibrations of the mast can be actively damped. Such active vibration damping is known from patent specifications DE 196 41 192 A1, JP 11-301815 A and JP 09-272606 A, for example. The feedback of the measurement values to the position control system of the displacement and lifting drives slows down the start of the positioning process and, especially when the bay operating device and the lifting unit have reached the target position, it is necessary to wait until the vibrations have been damped to a threshold, and this alone leads to a significant increase in the cycle times needed to transfer freight objects between the bay operating device and bay compartment due to the control structure, which means that the high-bay racking system is not able to satisfy the high performance demands placed on it.

Patent specification EP 0 806 715 B1 describes a method of controlling the drive of a bay operating system, likewise with active vibration damping, using an adaptive status controller which takes account of the dynamic status of the bay operating system at any one time and permits a broad range of optimization options. To this end, the instantaneous dynamic behavior of the bay operating system is calculated from existing data of a status and fault monitoring controller module, using measurement and setting variables containing information about the system dynamics and on the basis of coefficient characteristic maps. The characteristic maps contain constructive details and dynamic properties of the bay operating system, and system-dynamic variables of the bay operating system are determined from a basic setting and an iterative estimation algorithm in a controller module running an automatic self-learning coefficient identification procedure, and on the basis of mathematical equations based on calculated instantaneous dynamic behavior as the drive is controlled and vibrations of the bay operating system are actively damped. Although this controller concept offers a broad range of optimization options, it is extremely costly in terms of the design of the status controller, especially as the status controller must make allowance for a large number of different operating modes, such as the constructive layout, the dynamic properties of the bay operating system and such like.

A method of flatness based motion control for a differential cylinder of an elastic handling system is known from the research paper entitled "Flachheitsbasierte Regelung-Folgeregelung eines hydraulischen Differentialzylinder", edition November 19 [Flatness based control-sequence control of a hydraulic differential cylinder]. The differential cylinder is connected to a valve and has a flatness based control system, which receives from a servo-control system a desired trajectory calculated beforehand for controlling the movement of the piston between end positions. A time curve of a positioning variable, i.e. the control voltage at the valve, is calculated using the desired trajectory. Interference variables, such as parameter changes for example, cause variances between the desired and actual trajectory. An additional control system is used to stabilize the sequential motion of the piston position along the desired trajectory.

The publication entitled "Regelungstechnische Praxis", R. Oldenbourg Verlag GmbH, No. 45, 1997 [Control technology] discloses a method of flatness based motion control for a vehicle model, which is guided along a desired trajectory describing the process of parking the vehicle model in a parking space. Interference variables, such as slip during the controlled movement, lead to a variance from the desired trajectory. The sequential movement along the desired trajectory can be stabilized by means of a sequence control.

Patent specification DE 100 64 182 A1 discloses a crane or digger for swinging a load suspended on a support cable, which has a computer-controlled regulator for damping vibrations of the load, a path planning model, a centripetal force compensator and at least one axial controller for the slewing gear, tipping gear and hoisting gear.

Finally, another publication by ZAMM Z. in Angew. Math. Mech, 83, No. 2, pages 119-127 of 27 Jan. 2003 describes a "Flatness based control of a Timoshenko beam".

The underlying objective of the invention is to propose a method and a position control system which enable operation of a load handling device to be controlled in a simple and reliable manner and whereby any tendency of the load handling device to vibrate during operation is suppressed and the lifting unit can be exactly positioned at a start and a target position in the shortest time.

These objectives are achieved by the invention based on the aspects and features according to the invention. The advantage is that a rise above the threshold values of mechanical and electrical components, such as bending stress in the mast base region, uneven loading of the vertical guide rollers of the displacement unit, overload of the electrical drives of the displacement and lifting unit, is reliably avoided because the travel speeds and acceleration values of the displacement and lifting units are set to a permissible maximum. As proposed by the invention, dynamic deformations, in particular vibrations, of the load handling device caused by accelerating and decelerating the displacement and lifting unit are already generally suppressed during travel between the start and target positions by controlling the displacement and lifting unit along their optimized desired trajectories, so that when the lifting unit is in the target position, there is no longer any need to wait for time-consuming periods during which vibrations have to be damped. This offers two major advantages. Firstly, the cycle time needed for the procedure of positioning the lifting unit relative to a rack compartment and the process of lifting a freight object into and out of a rack compartment is significantly reduced and secondly, the dynamic deformations and changing stress on the load handling device, especially on a mast thereof, are significantly reduced. This also deals with the aspect of lightweight construction. The advantage gained here is that lower masses have to be accelerated and decelerated during the acceleration and deceleration phase. This leads to a reduction in the driving power needed and a higher positioning accuracy of the lifting unit relative to a rack compartment, for example. Furthermore, the service life and availability of the load bearing device can be increased. The servo-control system is also distinctive due to its simple design and it operates specifically in combination with a controller to position the displacement and lifting unit. The vibration damping controller used in the prior art in addition to the position controller can be dispensed with altogether as a result of the invention. These vibration damping controllers are incorporated in an automatic control circuit which receives a control variable from an additional measuring sensor detecting vibrations, which can be used to derive a damping force to correct a desired positioning force for the displacement and lifting drive predefined by the position controller. As a result of the invention, these time-consuming computing and control steps are avoided. It is sufficient to provide a position control system, thereby reducing the circuitry needed and cutting costs.

Advantageous features are also defined in further embodiments because the dynamic system behavior of the load handling device and the loading and unloading device can be described more accurately by means of the system variables and the servo-control system delivers an even better evaluation of the system behavior.

The features defined in further embodiments are also of advantage because a control algorithm based on the principle of a flatness-based control can be found without having to solve a differential equation system. This enables the computing complexity to be kept within limits and the computing time to be reduced. The desired trajectories for the system variables can be computed particularly quickly "online", even when the load handling device and loading and unloading device are in operation.

Also of advantage are the features defined in further embodiments, whereby interference factors not taken into account in the mathematical model are effectively corrected, such as temperature fluctuations at the mounting site of the load handling device, friction losses in the drive system, unstable freight object and such like for example, which could lead to variances in the actual positioning forces and set desired positioning forces acting on the displacement and lifting unit and the loading and unloading device, and the time curve of the actual positioning forces can be adapted to the time curve of the desired trajectory of the desired positioning forces. As a result of this adaptation procedure, vibrations caused by interference factors when the load handling device is moving and the loading and unloading device is being displaced can be simultaneously eliminated. The controller used is a PD-controller, for example, or a "flatness-based control system", by means of which excellent damping of the vibrations can be achieved. Since any vibrations which might be caused by the interference factors can now be eliminated, the duration of the stress occurring at the stress-critical mast base is reduced to the very minimum. The actual values of the actual positioning forces are detected on the basis of the torque or motor current of the drive motors of the displacement and lifting unit and loading and unloading device and evaluated.

The features defined in further embodiments are also of advantage because mechanical and dynamic deformations of the mast and stresses of the drives of the displacement and lifting unit and loading and unloading device can be detected as well. For example, if a measuring sensor, such as a strain gauge (DMS) is attached respectively to the mast base on the angularly offset side walls, a measurement of the bending moment at the mast base can be taken in the direction of travel and in the direction perpendicular to the direction of travel of the load handling device, thereby enabling conclusions to be drawn about vibrations of the mast. Since even the smallest variances in the desired bending of the mast from the actual bending of the mast or deflections of the mast in the direction of travel (x-direction) and perpendicular to the direction of travel (z-direction) of the load handling device can now be detected by measuring sensors, they and the active positioning procedures can be corrected by controlling the displacement and lifting unit and the loading and unloading device and their drives at an instant at which their deviation or amplitude is still very low. This results in further stabilization of the desired trajectory and the variances in the actual positioning forces described above from the set desired positioning forces of the displacement and lifting unit and the loading and unloading device can be kept within limits. This results in less stress on the mechanical components and drives of the displacement and lifting unit of the load handling device as well as the loading and unloading device.

As defined in further embodiments, a linearizing output is provided. The essential aspect of this is that variances in the actual curves of the reference trajectories from the desired curves of the reference trajectories for the displacement and lifting unit or loading and unloading device are corrected, thereby resulting in a more stable control structure. If the output does exhibit a tendency to such variances due to interference factors, it can easily be stabilized by means of conventional linear controllers.

The features defined in further embodiments are of advantage because different reference trajectories optimized for mechanical and/or dynamic loads can be planned for different deployment conditions of the load-bearing device for example, and the most suitable reference trajectory can be used to control operation of the load handling device and loading and unloading device. For example, reference trajectories optimized for different ambient conditions can be stored in the memory, thereby enabling the use of servo-control systems of a standard configuration for a particular type of load handling device without having to resort to different servo-control systems adapted to the deployment conditions, thereby drastically reducing the number of different types of servo-control systems. The advantage of this is that when manufacturing load handling devices, any risk of confusion between different servo-control systems for different applications is ruled out. It is not until the load handling device is switched on that the reference trajectory best suited to the corresponding application is activated, for example by a means (input device), for example a computer or the warehouse management system, and the other reference trajectories are deactivated or frozen and only the reference trajectory which is actively switched on is used to compute the desired trajectories.

Other advantageous features are defined in further embodiments, whereby different reference trajectories do not have to be planned separately for different types of load handling devices, for example with a different mast height or drives for the displacement and lifting unit, or loading and unloading devices with different weights, number of masts and such like, and instead, a single reference trajectory is determined respectively for the displacement and lifting unit or loading and unloading device, to which correction factors are applied, which in turn means that optimized desired trajectories can be determined for every type of load handling device or loading and unloading device. The advantage of this is that it reduces the number of reference trajectories to be stored and thus reduces the amount of memory space needed to store the reference trajectories. The correction factors assigned to each of the different types of load handling device or loading and unloading device are input in the servo-control system via appropriate means (input device) by an operator from a list of correction factors which can be selected, for example via the warehouse management system or an additional computer, and are determined by computation or experimentally. For example, correction factors are applied to each of the desired trajectories for the displacement and lifting unit or loading and unloading device depending on the type of load handling device or loading and unloading device.

The features defined in further embodiments are also of advantage because the optimized desired trajectories are always computed for the displacement of the load handling device or the displacement of the loading and unloading device between a start and a target position, thereby guaranteeing that the displacement and lifting unit or the loading and unloading device can be displaced at the maximum possible speed or acceleration taking account of their mechanical and dynamic threshold values.

However, the objectives of the invention area also achieved by the features defined in further emboidments. The advantage here is that a situation in which the threshold values of mechanical and electrical components are exceeded, such as bending stress in the mast base region, uneven load of the vertical and lateral guide rollers of the load handling device, overload of the electric drive of the loading and unloading device, is reliably prevented because the displacement speeds as well as the acceleration values of the loading and unloading device are set to a permissible maximum. For the purpose of the invention, dynamic deformations at the load handling device as well as the loading and unloading device generated by the acceleration and deceleration of the loading and unloading device are already generally suppressed during the displacement between the start and target positions by controlling the actuator drive for the loading and unloading device along optimized desired trajectories, so that when the loading and unloading device is in the target position, it is no longer necessary to waste time waiting for vibrations at the load handling device to be damped, in particular the deflection of a mast in the z-direction. Accordingly, the deformation in the target position has already been reduced to zero. This offers significant advantages, such as reduced stress on the load-bearing, bottom displacement unit of the load handling device, minimization of the cycle times needed to store and remove freight objects, optimization of the aisle width as well as a reduction in the inward and outward travel path of the loading and unloading device in the z-direction. In addition, the extra distance which the loading and unloading device needs to travel on the side wall of the freight object remote from an aisle in order to accommodate at least one freight object safely is minimized, the inward and outward travel paths of the loading and unloading device are shortened and the cycle time for the loading and unloading operation can be further reduced. Moreover, the loading and unloading operation can proceed with a high degree of reliability and without the risk of potential collisions or undesired misalignment of the freight object with respect to the loading and unloading device.

Finally, a further embodiment is also of advantage because the desired positioning forces determined from the desired trajectories can now be transmitted to the actuator members essentially without having to make allowance for longer transmission times, as a result of which a positioning intervention will have an immediate effect on the dynamic behavior of the load handling device.

The invention will be described in more detail below with reference to examples of embodiments illustrated in the appended drawings.

Of these:

Figure 20:
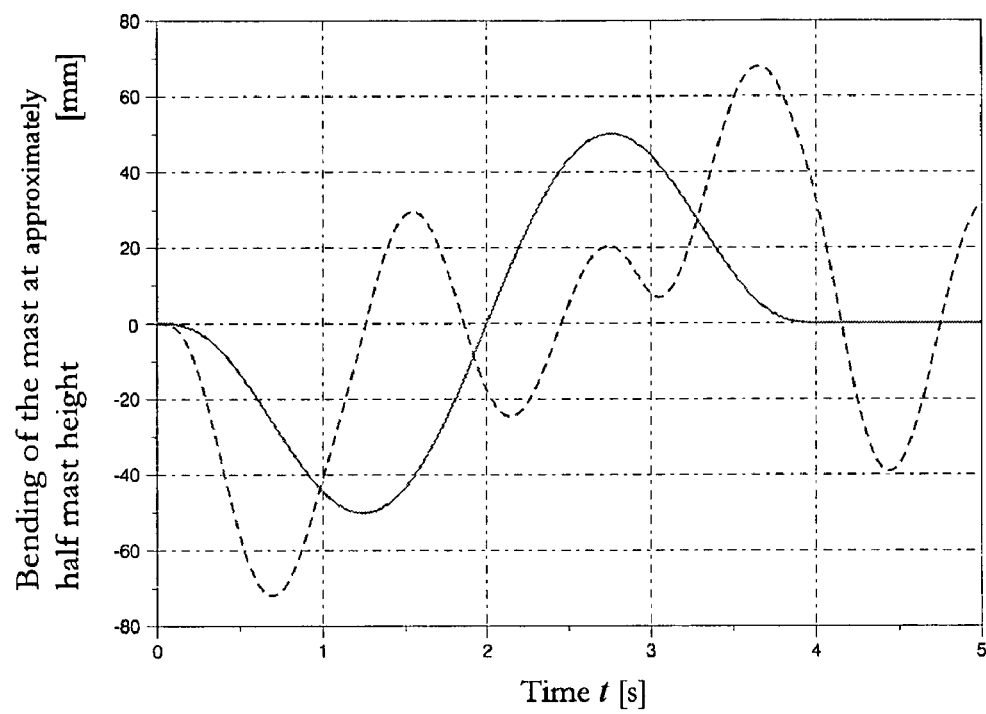
Figure 21:
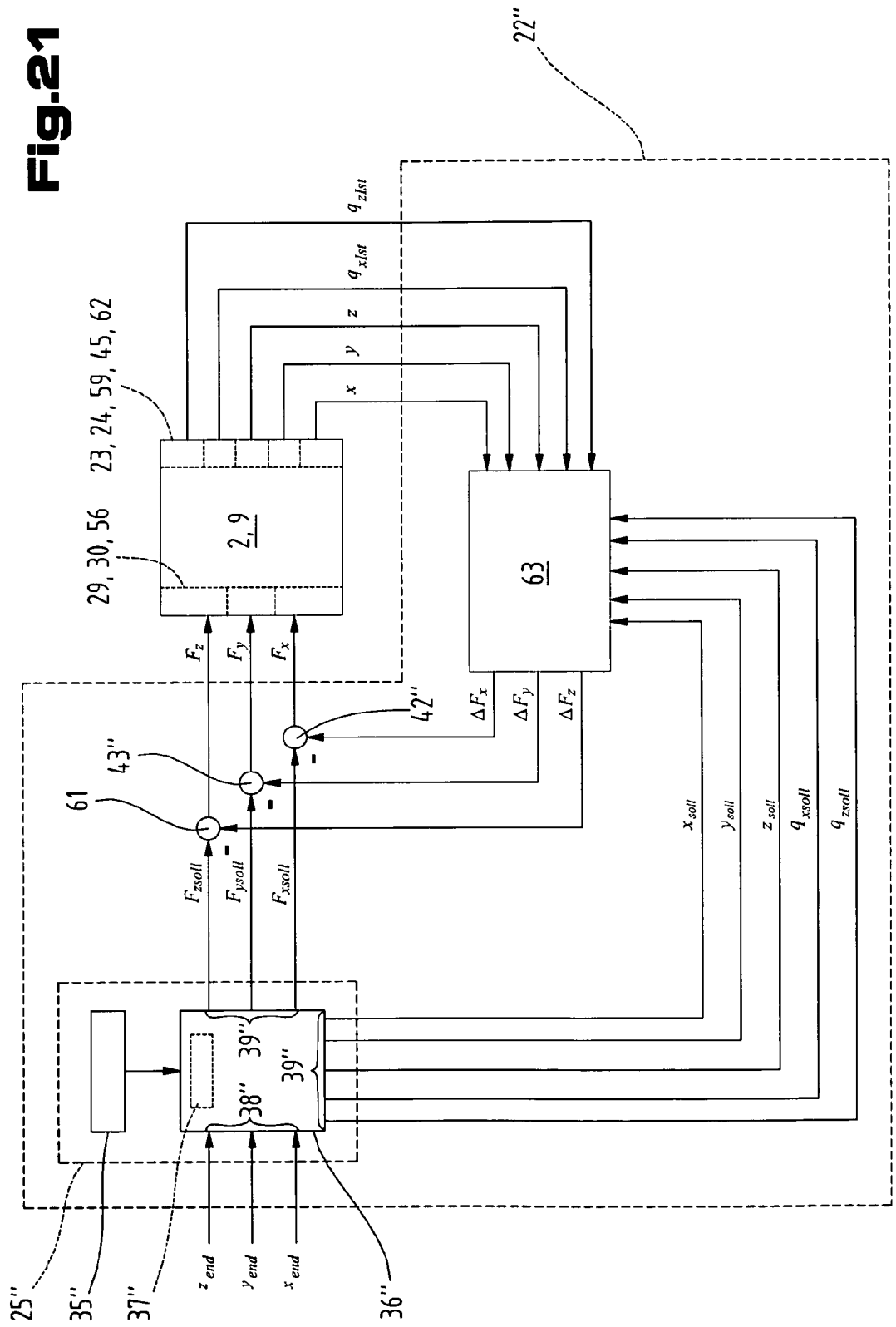
Figure 22:
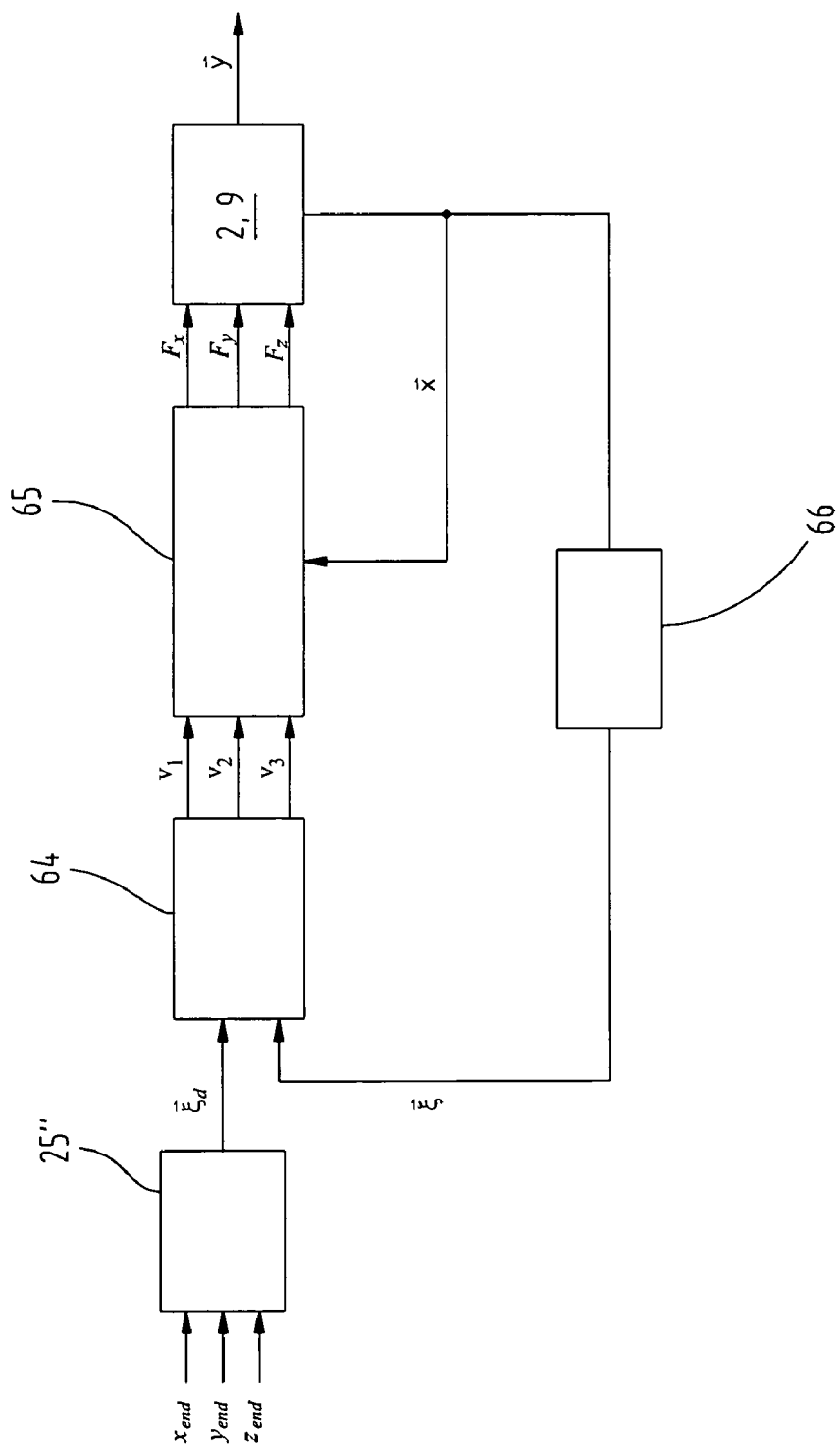

FIG. 16 to 19 are diagrams plotting the time curves of the system variables, such as desired positioning forces and desired positions serving as desired trajectories, derived from the time curves of the flat outputs of the loading and unloading device as well as the lifting unit, where the lifting unit is moved in front of a rack compartment to approximately half the mast height into the target position and remains there during the operation of depositing or removing the freight object;

FIG. 20 are curves plotting bending of the mast at approximately half mast height in the z-direction to provide a comparison between control of the load handling device with a flatness-based control shown by a solid line and a conventional control of the load handling device shown by a broken line;

FIG. 21 is a block diagram of a position control system for the load handling device and its loading and unloading device;

FIG. 22 is a block diagram of another embodiment of a position control system with a flatness-based control system.

Firstly, it should be pointed out that the same parts described in the different embodiments are denoted by the same reference numbers and the same component names and the disclosures made throughout the description can be transposed in terms of meaning to same parts bearing the same reference numbers or same component names. Furthermore, the positions chosen for the purposes of the description, such as top, bottom, side, etc., relate to the drawing specifically being described and can be transposed in terms of meaning to a new position when another position is being described. Individual features or combinations of features from the different embodiments illustrated and described may be construed as independent inventive solutions or solutions proposed by the invention in their own right.

Figure 1:
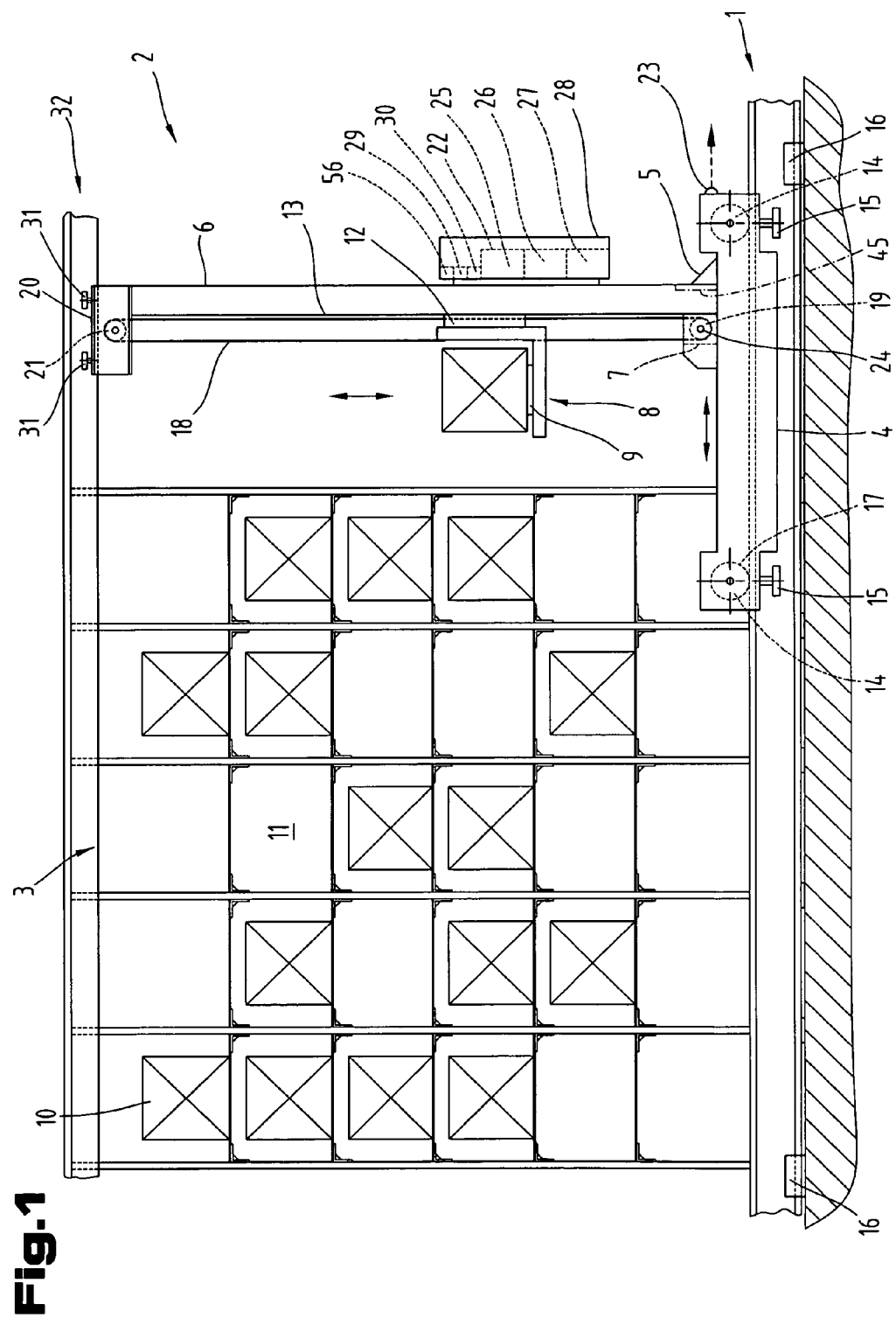
FIG. 1 is a schematic diagram of a high-bay racking system with a high-bay rack and a load handling device viewed in elevation.

FIG. 1 provides a schematic illustration of a high-bay racking system, comprising a load handling device 2 which can be displaced along a guide track 1 and high-bay racks 3 disposed on the two sides of the guide track 1. In this example of an embodiment, the load handling device 2 is provided in the form of a rack conveyor, in particular a bay operating device. This bay operating device has a vertical mast 6 secured to a bottom displacement unit 4 by means of brackets 5 so as to be resistant to bending and a lifting unit 8 which can be displaced vertically along it by means of a lift drive 7 as well as a loading and unloading device 9 disposed on the latter for depositing and removing freight objects 10 in and from a rack compartment 11 of the high-bay rack 3. The lifting unit 8 is provided with a schematically illustrated guide system 12 and the mast 6 is provided with a schematically illustrated guide track 13 so that the lifting unit 8 is mounted so that it can be displaced on the guide track 13 on the mast 6 by means of the guide system 12.

The bottom displacement unit 4 is rotatably mounted on the bottom guide track 1 by means of vertical and lateral guide rollers 14, 15 and can be displaced by means of a drive of at least one the vertical guide rollers 14 along the track 1 in the aisle direction as indicated by the double arrow (x-direction). The guide track 1 runs along the aisle between the high-bay racks 4 and is mounted on the floor of a hall by means of fixing clamps 16. The guide track 1 is preferably flange-shaped in the form of an I-rail.

The lateral guide rollers 15 are disposed in pairs so that they roll on a vertical web of the guide track 1 and the vertical guide rollers 14 are supported on a horizontally extending top belt remote from the floor. The vertical and lateral guide rollers 14, 15 are spaced apart from one another in the longitudinal direction of the displacement unit 4 and disposed one after the other on the two sides of the mast 6 in the direction of travel of the bay operating systems—as indicated by the double arrow. The driven vertical guide roller 14 is coupled with a displacement drive 17 and is directly driven by it.

Alternatively, however, the rack conveyor with its vertical guide rollers 14 may also be supported directly on the floor of a hall constituting the guide track 1.

The mast head is provided with a bracket, which simultaneously constitutes a top displacement unit 20 or running gear, on which the lateral guide rollers 31 are mounted in pairs so that they can rotate freely. They lie so that they can roll on vertical webs of a top guide track 32. The guide track 32 is provided in the form of a guide rail with a profiled cross-section, for example, and is secured between the high-bay racks 3 to cross-members connected to the latter or to a ceiling of a hall. In this embodiment, the top displacement unit 20 serves exclusively as a lateral guide of the mast head for the load handling device 2 along the guide track 32.

As also illustrated in FIG. 1, the lifting unit 8 is coupled via at least one drive element 18, in particular a traction means, with the lift drive 7 and is guided so that it can rotate about a driving gear 19 mounted on the bracket 5 in the region of the mast base and a rotatable pulley wheel 21 mounted on the bracket in the region of the mast head and fixedly connected to the lifting unit 8 by means of its two free ends. The driving gear 19 is coupled with the lift drive 7 and is driven directly by the latter. The belt-type traction means is provided in the form of a chain, cogged belt or similar, for example. The traction means is expediently provided in the form of a cogged belt, which positively meshes with the driving gear 19 and essentially transmits a slip-free lifting movement to the lifting unit 8, displacing the lifting unit 8 as indicated by the double arrow (y-direction).

The lift and displacement drives 7, 17 are each provided in the form of electric motors, such as asynchronous motors, servo-motors or stepper motors, for example.

In order to position the bay operating systems or the displacement and lifting unit 4, 8 relative to a rack compartment 1, a position control system 22 is provided, comprising a distance measuring system 23 serving as an actual value transmitter for the displacement unit 4, a distance measuring system 24 serving as an actual value transmitter for the lifting unit 8, a flatness-based servo-control system 25 which will be described in more detail below and a first position controller 26 for the displacement unit 4 based on a first embodiment and a second position controller 27 for the lifting unit 8. The distance measuring system 23 is provided in the form of a distance sensor or laser or infrared system, whilst the distance measuring system 24 is provided in the form of a rotary or incremental transmitter coupled with the lift drive 7, for example. The instantaneous position of the displacement and lifting unit 4, 8 is detected by means of the distance measuring systems 23 and serves as an actual value or actual position and as a start position when the bay operating system is stationary. An end position or target position of the displacement and lifting unit 4, 8 is predefined by the warehouse management system, in particular by a higher-order master computer, which can therefore be applied by means of the "flatness-based control system" described in more detail below as a default for reference trajectories for the displacement and lifting unit 4, 8. The target position corresponds to a rack compartment 11 in or from which a freight object 10 must be deposited or removed.

The position control system 22 and power electronics (not illustrated) for the lifting and displacement drive 7, 17 are disposed in a switch cabinet, to which the load handling device 2 is secured.

The lifting and displacement drives 7, 17 are each activated by means of a schematically indicated actuator member 29, 30 and supplied with voltage in order to control the motor speed and their travel speed. The actuator members 29, 30 are provided in the form of variable-frequency inverters, servo-amplifiers, step-by-step amplifiers, current converters and such like, for example, constituting an integral part of the position control system 22 and incorporated in its circuitry. An additional controller for damping vibrations which might be caused by interference factors during operation of the bay operating systems may be dispensed with due to the method proposed by the invention, as will be explained in more detail below. This significantly simplifies the configuration of the position control system 22.

Figure 2:
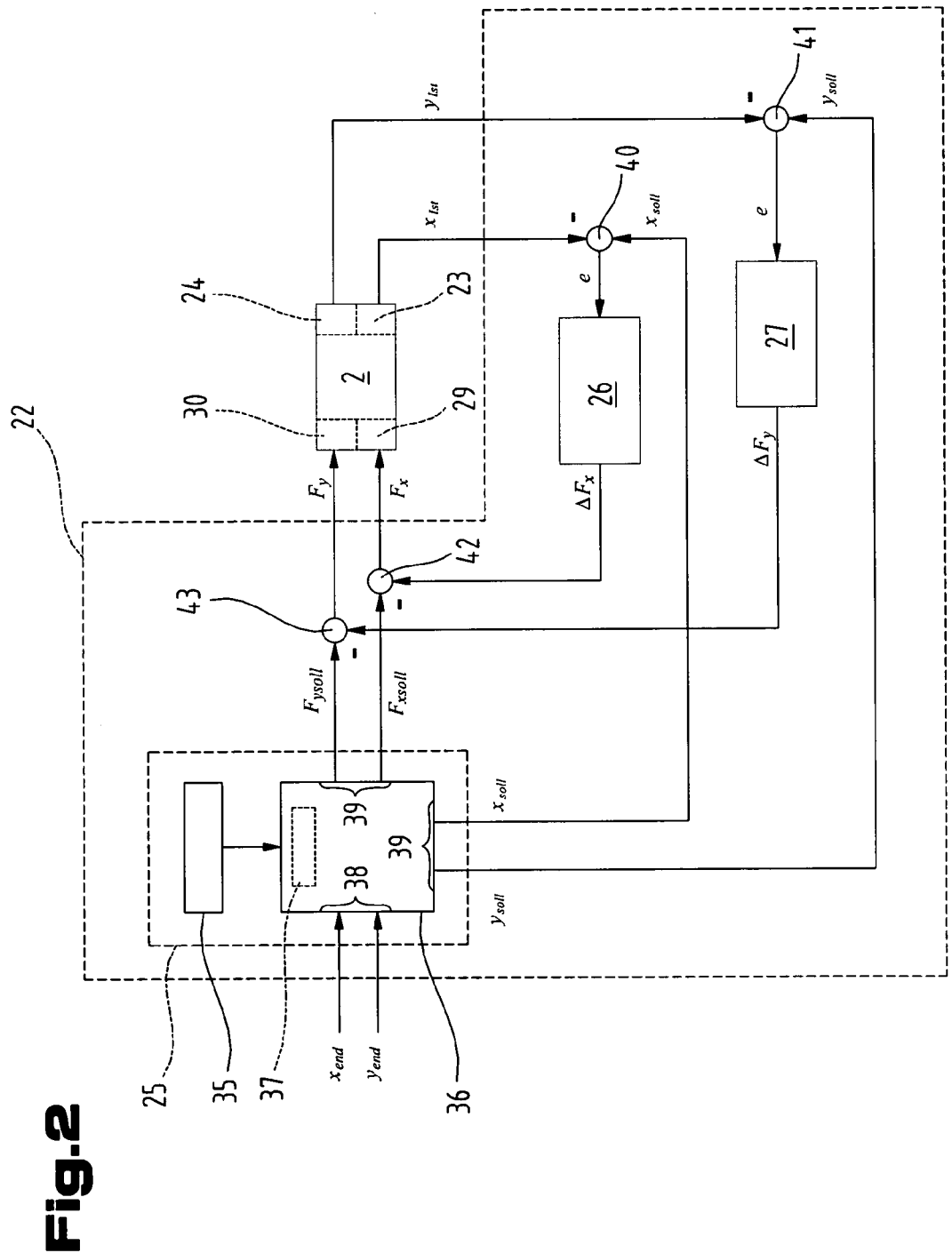
FIG. 2 is a block diagram illustrating a first embodiment of a position control system for the load handling device illustrated in FIG. 1, as proposed by the invention.

FIG. 2 is a circuit diagram of the position control system 22 for the bay operating system illustrated in FIG. 1. The position control system 22 comprises the servo-control system 25, which in turn comprises at least one memory 35 and at least one computer module 36, in particular a microprocessor, with a logic system 37, in particular a program logic, control inputs 38 and control outputs 39. The circuitry of the memory 35 is connected to the micro-processor so that the microprocessor can be supplied with its memory contents. The memory 35 could also be integrated in the computer module 36. The control inputs 38 are connected to the warehouse management system (not illustrated), for example a master computer, one of which receives a target position $x_{end}$ to which the displacement unit 4 is to be moved, the other receiving the target position $y_{end}$ to which the lifting unit 8 is to be moved.

In the target positions of the lifting und displacement drives 7, 17, the lifting unit 8 and the loading and unloading device 9 are positioned in front of a rack compartment 11 of the high-bay rack 4 so that a freight object 10 disposed on the lifting unit 8 can be deposited in the rack compartment 11 or a freight object 10 disposed in the rack compartment 11 can be moved out onto the lifting unit 8.

Reference trajectories correlated to a type of bay operating device are stored in the memory 35 as a mathematical function and can be retrieved, as will be explained in more detail below, one of which is defined for the system displacement unit 4 and the other of which for the system lifting unit 8. Mechanical and/or dynamic threshold values or parameters of the bay operating system may also be stored in the memory 35, for example the maximum permissible mast base bending moment or mast base stress, the maximum permissible weight of the freight object 10 on the lifting unit 8, the maximum amplitude of the vibration deflection of the mast tip in the x-direction, the maximum positioning force or driving force on the displacement unit 4 and such like.

The reference trajectories describe an optimum time curve of the system behavior of the bay operating device, computed on the basis of mathematical equation systems. The system behavior is defined by the maximum permissible mechanical and dynamic loads/threshold values of the bay operating system and the time-minimized movement of the displacement and lifting unit 4, 8 from a start position to a target position and is described in a mathematical model for determining the reference trajectories. The reference trajectories are forwarded from the memory 35 to the computer module 36 via a line.

Figure 5:
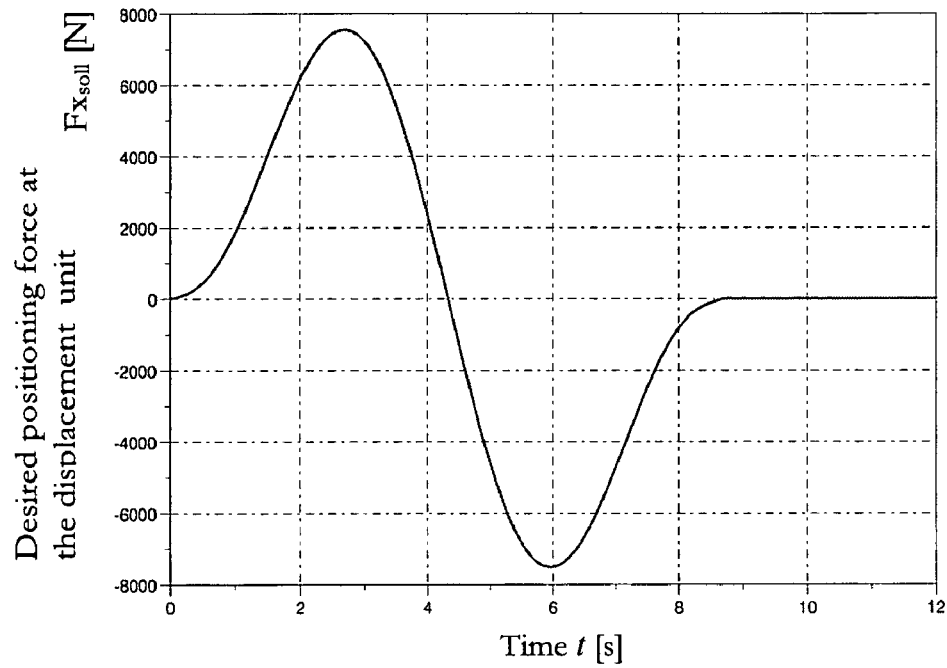
FIG. 5 to 8 are diagrams of the time curves of the system variables, such as desired positioning forces and desired positions serving as desired trajectories, derived from the time curves of the flat outputs of the displacement and lifting unit.
Figure 6:
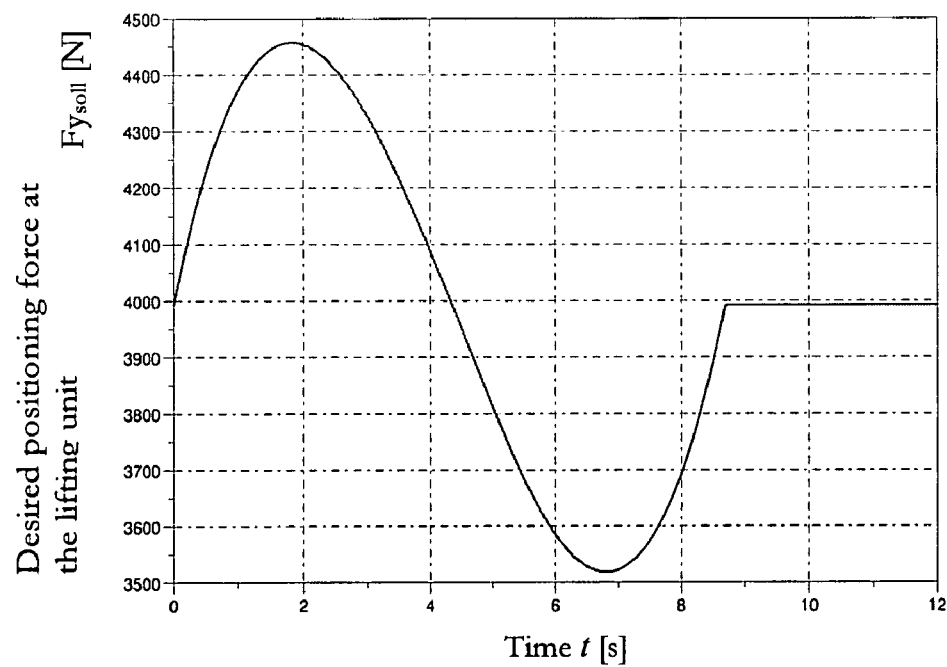
Figure 7:
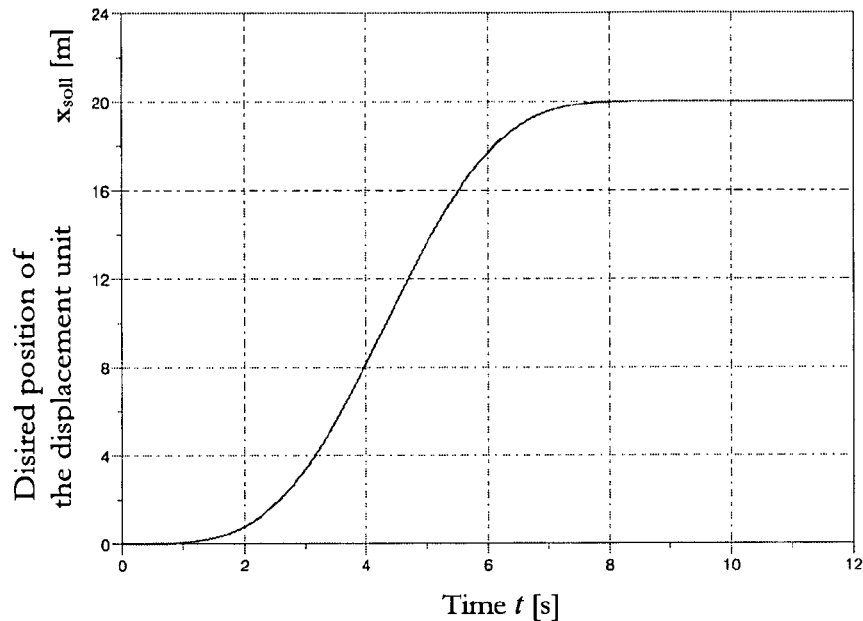
Figure 8:
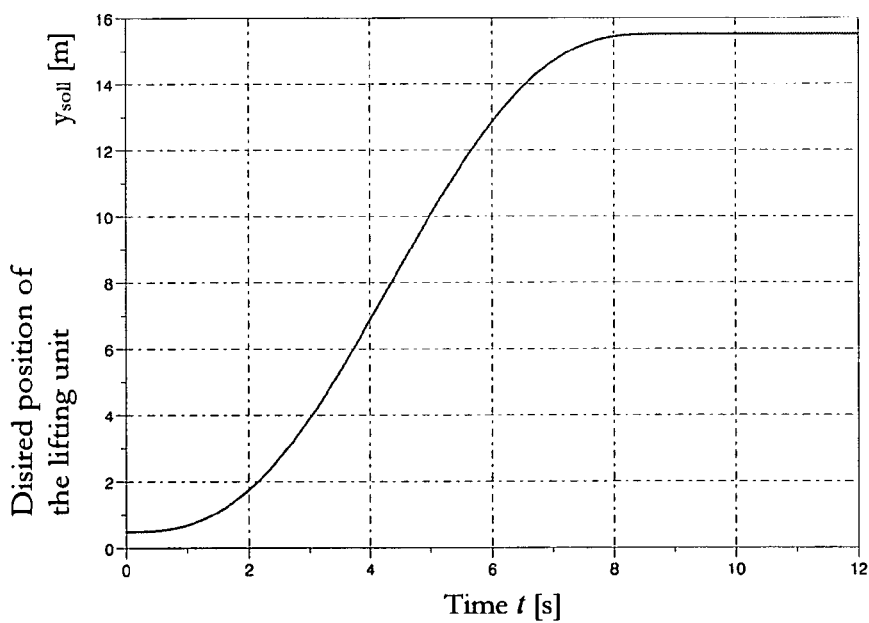

The target positions $x_{end}$, $y_{end}$ defined by the warehouse management system are therefore forwarded to the computer module 36 of the servo-control system 25 at the control inputs 38 and, based on the reference trajectories (see FIGS. 3 and 4) read from the memory 35, it computes the actual or start positions $x_{lst}$, $y_{lst}$ and the target positions $x_{end}$, $y_{end}$, the desired trajectories for the system variables of at least the desired positioning forces $F_{xsoll}$, $F_{ysoll}$ (see FIGS. 5 and 6) and the desired positions $x_{soll}$, $y_{soll}$ (see FIGS. 7 and 8) for the displacement and lifting units 4, 8 and their lifting und displacement drives 7, 17 using an appropriate algorithm, and the desired positioning forces $F_{xsoll}$, $F_{ysoll}$ and desired positions $x_{soll}$, $y_{soll}$ are output via the control outputs 39 and forwarded to the position control circuits for the displacement and lifting units 4, 8.

As will be described below, the position control circuits comprise position controllers 26, 27, provided in the form of PD-controllers for example. The idealized mathematical model for computing the reference trajectories does not take account of any external interference factors affecting the system bay operating device, such as fluctuations in the ambient temperature for example. For this reason, during real operation of the bay operating systems, the time curve of the system variables and actual values of the actual position (measurement variable) may deviate from the desired trajectory. The variance of the current values from the desired trajectory of the system variables is minimized by means of the position controllers 26, 27.

Naturally, it would also be possible to adapt the stored reference trajectories as a function of the prevailing ambient conditions or used defined different trajectory curves for different ambient conditions, in which case the most suitable trajectory is used to control operation of the bay operating device.

By means of the position controllers 26, 27, there is now an easy way of making allowance for interference factors that are not taken into account when mapping the reference trajectories, such as friction between the driven vertical guide roller 14 and the track or said ambient conditions at the deployment site of the high-bay racking system and such like.

Figure 9:
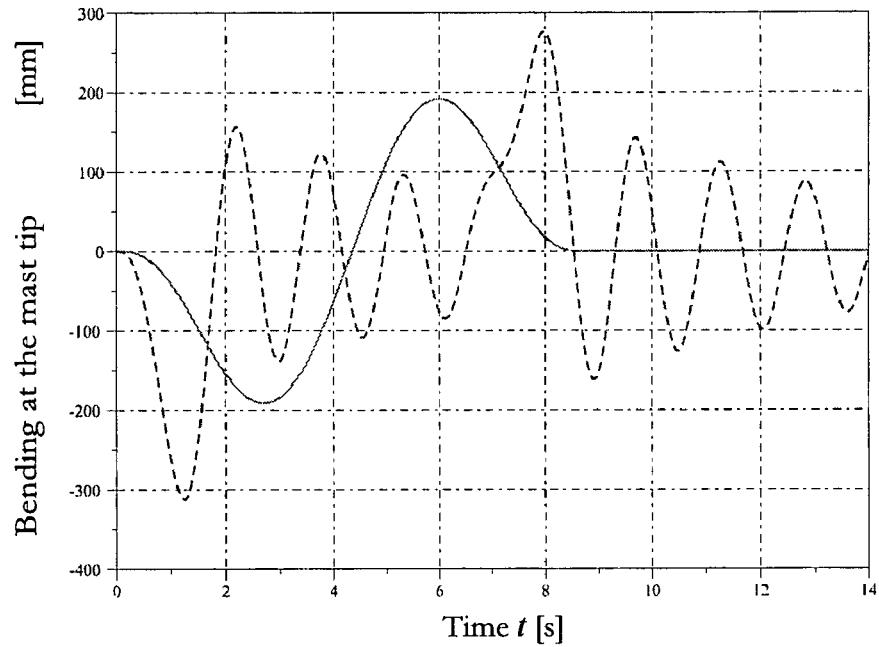
FIG. 9 shows curves plotting the bending of the mast tip in the x-direction to provide a comparison between control of the load handling device with a flatness-based control shown by a solid line and a conventional control of the load handling device shown by a broken line.

Variances which occur due to the external interference factors merely have to be controlled by the position controllers 26, 27, whilst the main time curves of the system variables $F_{xsoll}$, $F_{ysoll}$, $x_{soll}$, $y_{soll}$ are predefined by the respective trajectory curve. The first computation of the desired positions $x_{soll}$, $y_{soll}$ as a function of time results in the desired velocities $v_{xsoll}$, $v_{ysoll}$ for the displacement and lifting units 4, 8 and their desired trajectories (not illustrated). By controlling the displacement and lifting units 4, 8 and their displacement and lifting drives 7, 17 along predefined desired trajectories, vibrations of the mast 6 or a mast deflection can largely be suppressed as the lifting unit 8 is being positioned in the target position relative to a rack compartment 11, as illustrated in FIG. 9.

The position controllers 26, 27 are not only able to correct the variances described above efficiently and control the exact movement to the target positions $x_{end}$, $y_{end}$ predefined by the warehouse management system, they can also compensate for variances from the desired trajectories caused by interference factors because the correction between the time curve of the actual values of the system variables and the predefined desired trajectories of the system variables also results in a stabilization of the desired trajectories. Due to this positive side-effect, an additional damping controller such as would be used in the prior art can be totally dispensed with, thereby significantly reducing the cost of the position control system and the cycle times for procedures to position the displacement and/or lifting unit 4, 8 in the target position.

As also illustrated in FIG. 2, a comparator element 40, 41 is respectively connected upstream of the position controller 26 for the displacement unit 4 and the position controller 27 for the lifting unit 8, where a control variance (e) between the measured actual values of the system variables (actual trajectories) and set desired trajectories of the system variables is computed, in particular the desired position $x_{soll}$, $y_{soll}$ and the actual position $x_{Ist}$, $y_{Ist}$. The control variance (e) is forwarded to the position controllers 26, 27. An interference variable is calculated from the control variance (e) on the basis of a fixed rule of law, in particular a differential force $\Delta F_x$, $\Delta F_y$, which is respectively forwarded to a comparator element 42, 43 connected downstream of the position controllers 26, 27 with a view to overriding the interference variable and is superimposed on the set desired trajectories of the system variables, in particular the desired positioning forces $F_{xsoll}$, $F_{ysoll}$, as well as the current positioning forces $F_x$, $F_y$ as a correction value. The actuator members 29, 30 of the displacement and lifting drives 7, 17 receive the positioning forces $F_x$, $F_y$ calculated from the desired-actual comparison of the desired trajectories for the system variables, in particular the desired positioning forces $F_{xsoll}$, $F_{ysoll}$ and the interference variables, in particular the differential forces $\Delta F_x$, $\Delta F_y$, which have been corrected. Variances caused by the interference factors described above are corrected or compensated by the differential force $\Delta F_x$, $\Delta F Y$. Accordingly, the interference variable, in particular the differential force $\Delta F_x$, $\Delta F_y$, corresponds to a correction factor for the interference factors. The current positioning forces $F_x$, $F_y$ are converted by means of the actuator members 29, 30 of the displacement and lifting drives 7, 17, for example the variable-frequency inverter, into a voltage of an appropriate frequency, by means of which the asynchronous motors are accelerated or decelerated at a speed proportional to the frequency, for example. The current positioning forces $F_x$, $F_y$ are forwarded to the actuator members 29, 30 of the lifting und displacement drives 7, 17.

A description will now be given of how the reference trajectories are calculated in order to make allowance for the load handling device 2 in accordance with the "flatness based control system". "Flatness based control systems" have made major inroads into industry in recent times. Differential algebra constitutes the mathematical basis of "flatness based control", according to Fliess, M. All status and input variables of the system can be calculated without integration or having to solve differential equations as a function of at least one "flat output" or linearizing system output. The number of flat outputs is equal to the number of input variables. Flat outputs can be defined for the specific bay operating device. Where a "flat output" exists, the status and input variables can be calculated as a function of the "flat output" and its time derivatives.

Once the linearizing system outputs for the displacement and lifting unit 4, 8 have been found, the associated reference trajectories are prepared and calculated "offline" in the first step, after which the desired trajectories are calculated "online" during operation and the position controllers 26, 27 are then set up to stabilize the subsequent movement along this desired trajectory.

The system behavior of the bay operating systems is described in the first model for the x- and y-direction by a partial differential equation system, which can no longer be exactly solved, generally speaking. The Ritz approximation method is therefore used for this purpose. The result is a mathematical model, now a standard differential equation system in the form $$M(q)\ddot{q}+K(q,\dot{q})=Q$$

which is simultaneously the output point of the plan of the "flatness based control". This expression describes the motion equation of the bay operating systems, where M(q) denotes the mass matrix, and the term K(q,q̇) includes the other terms such as centrifugal forces, Corioli forces and Q denotes the generalized forces. The optimum curve of the reference trajectories can be mathematically calculated using the plan model. In this respect, it is also possible to take account of the mechanical und dynamic threshold values described above.

The above-mentioned differential equation can be rewritten in the state space in a system of non-linear differential equations $$\bar{x}=f(\bar{x},\bar{u})$$

$$\bar{y}=h(\bar{x},\bar{u})$$

The status variables in the vector are:

$$\bar{x} = \begin{pmatrix} x \\ v_x \\ q_x \\ v_{q_x} \\ y \\ v_y \end{pmatrix}$$

$x$ ... position of the displacement unit $v_x$ ... velocity of the displacement unit $q_x$ ... mast deflection in the $x$-direction $v_{q_x}$ ... velocity of the mast deflection in the $x$-direction $y$ ... position of the lifting unit $v_y$ ... velocity of the lifting unit The status variables are variables with the property whereby the system output $\bar{y}$ is un-ambiguously set by the curve of $\bar{u}(t)$ starting from a start point $t_0$ and the values of $\bar{x}(t_0)$.

The input variables in the vector are:

$$\bar{u} = \begin{pmatrix} F_x \\ F_y \end{pmatrix}$$

$F_x$ ... positioning force on the displacement unit $F_y$ ... positioning force on the lifting unit The output variables in the vector are:

$$\bar{y} = \begin{pmatrix} x \\ y \\ q_x \end{pmatrix}$$

$x$ ... position of the displacement unit $y$ ... position of the lifting unit $q_x$ ... mast deflection in the $x$-direction The output variables enable the behavior of the system to be observed. If they can be detected by measuring systems, they are also referred to as measurement variables (control variables). The output variables are those measurement variables which are needed for control purposes, such as the actual values of the x- and y-positions and/or velocity $v_x$, $v_y$ of the displacement and lifting unit 4, 8. In the case of the embodiment illustrated in FIG. 11, the actual values of the dynamic behavior are also detected, such as desired bending $q_x$ and/or the velocity thereof $\dot{q}_x$.

The status and input variables define the system variables.

Since the "flatness" property can be demonstrated for the mathematical model of the bay operating systems, there also exist variables referred to as flat outputs
$\xi_1(\bar{x})$ und $\xi_2(\bar{x})$ $\xi_1(\bar{x})$ . . . first flat output
$\xi_2(\bar{x})$ . . . second flat output
which are in turn expressed by the status variables, with the property whereby all the system variables can be expressed by these flat outputs and their time derivatives.

$$x = x(\xi_1, \dot{\xi}_1, \ddot{\xi}_1, \ldots, \xi_1^{(\alpha 1)}, \xi_2, \dot{\xi}_2, \ddot{\xi}_2, \ldots, \xi_1^{(\alpha 2)})$$

$$v_x = v_x(\xi_1, \dot{\xi}_1, \ddot{\xi}_1, \ldots, \xi_1^{(\beta 1)}, \xi_2, \dot{\xi}_2, \ddot{\xi}_2, \ldots, \xi_1^{(\beta 2)})$$

$$q_x = q_x(\xi_1, \dot{\xi}_1, \ddot{\xi}_1, \ldots, \xi_1^{(\chi 1)}, \xi_2, \dot{\xi}_2, \ddot{\xi}_2, \ldots, \xi_1^{(\chi 2)})$$

$$v_{q_x} = v_{q_x}(\xi_1, \dot{\xi}_1, \ddot{\xi}_1, \ldots, \xi_1^{(\delta 1)}, \xi_2, \dot{\xi}_2, \ddot{\xi}_2, \ldots, \xi_1^{(\delta 2)})$$

$$y = y(\xi_1, \dot{\xi}_1, \ddot{\xi}_1, \ldots, \xi_1^{(\epsilon 1)}, \xi_2, \dot{\xi}_2, \ddot{\xi}_2, \ldots, \xi_1^{(\epsilon 2)})$$

$$v_y = v_y(\xi_1, \dot{\xi}_1, \ddot{\xi}_1, \ldots, \xi_1^{(\phi 1)}, \xi_2, \dot{\xi}_2, \ddot{\xi}_2, \ldots, \xi_1^{(\phi 2)})$$

$$F_x = F_x(\xi_1, \dot{\xi}_1, \ddot{\xi}_1, \ldots, \xi_1^{(\phi 1)}, \xi_2, \dot{\xi}_2, \ddot{\xi}_2, \ldots, \xi_1^{(\phi 2)})$$

$$F_y = F_y(\xi_1, \dot{\xi}_1, \ddot{\xi}_1, \ldots, \xi_1^{(\gamma 1)}, \xi_2, \dot{\xi}_2, \ddot{\xi}_2, \ldots, \xi_1^{(\gamma 2)})$$

The desired trajectories of the system variables for controlling the bay operating system are determined from these equations by predefining the time curve of the variables $\xi_{1d}(t)$ and $\xi_{2d}(t)$ without having to solve a differential equation system. This is important because a non-linear system, such as one which also describes the dynamic behavior of the bay operating system, can generally not be solved and there is therefore no other way of calculating back to the input variables.

The desired trajectories of the system variables therefore result as follows $$x_d = x(\xi_{1d}, \dot{\xi}_{1d}, \ddot{\xi}_{1d}, \ldots, \xi_{1d}^{(\alpha 1)}, \xi_{2d}, \dot{\xi}_{2d}, \ddot{\xi}_{2d}, \ldots, \xi_{2d}^{(\alpha 2)})$$

$$v_{xd} = v_x(\xi_{1d}, \dot{\xi}_{1d}, \ddot{\xi}_{1d}, \ldots, \xi_{1d}^{(\beta 1)}, \xi_{2d}, \dot{\xi}_{2d}, \ddot{\xi}_{2d}, \ldots, \xi_{2d}^{(\beta 2)})$$

$$q_{xd} = q_x(\xi_{1d}, \dot{\xi}_{1d}, \ddot{\xi}_{1d}, \ldots, \xi_{1d}^{(\chi 1)}, \xi_{2d}, \dot{\xi}_{2d}, \ddot{\xi}_{2d}, \ldots, \xi_{2d}^{(\gamma 2)})$$

$$v_{q_x d} = v_{q_x}(\xi_{1d}, \dot{\xi}_{1d}, \ddot{\xi}_{1d}, \ldots, \xi_{1d}^{(\delta 1)}, \xi_{2d}, \dot{\xi}_{2d}, \ddot{\xi}_{2d}, \ldots, \xi_{2d}^{(\delta 2)})$$

$$y_d = y(\xi_{1d}, \dot{\xi}_{1d}, \ddot{\xi}_{1d}, \ldots, \xi_{1d}^{(\epsilon 1)}, \xi_{2d}, \dot{\xi}_{2d}, \ddot{\xi}_{2d}, \ldots, \xi_{2d}^{(\epsilon 2)})$$

$$v_{yd} = v_y(\xi_{1d}, \dot{\xi}_{1d}, \ddot{\xi}_{1d}, \ldots, \xi_{1d}^{(\phi 1)}, \xi_{2d}, \dot{\xi}_{2d}, \ddot{\xi}_{2d}, \ldots, \xi_{2d}^{(\phi 2)})$$

$$F_{xd} = F_x(\xi_{1d}, \dot{\xi}_{1d}, \ddot{\xi}_{1d}, \ldots, \xi_{1d}^{(\phi 1)}, \xi_{2d}, \dot{\xi}_{2d}, \ddot{\xi}_{2d}, \ldots, \xi_{2d}^{(\phi 2)})$$

$$F_{yd} = F_y(\xi_{1d}, \dot{\xi}_{1d}, \ddot{\xi}_{1d}, \ldots, \xi_{1d}^{(\gamma 1)}, \xi_{2d}, \dot{\xi}_{2d}, \ddot{\xi}_{2d}, \ldots, \xi_{2d}^{(\gamma 2)})$$

When the desired trajectories for the positioning variables $F_{xd}(t)$ and $F_{yd}(t)$ are switched to the bay operating device, the system moves exactly along these calculated system variables.

The time curves $\xi_{1d}(t)$ and $\xi_{2d}(t)$ will be referred to as reference trajectories below. In order to control the bay operating system, it is sufficient for the desired positioning forces $F_{xsoll}$, $F_{ysoll}$, the desired positions $x_{soll}$, $y_{soll}$ and/or the desired velocities $v_{xsoll}$ und $v_{ysoll}$ to be forwarded to the position control system 22. In the embodiment illustrated in FIG. 11, the desired bending $q_{soll}$ and its desired velocity $\dot{q}_x$ are also necessary.

The reference trajectories are now planned, taking account of the mechanical and/or dynamic threshold values of the bay operating systems, for which purpose the start and end values for the start and target positions of the displacement and lifting unit have to be set first of all. What needs to be taken into account is that the displacement and lifting unit 4, 8 is to be moved by the bay operating device along the desired trajectories in infinite time from a stationary position in the start position to a stationary position in the target position and the bay operating device must reach the target position free of vibration.

This results in the following equations $$x(0) = x_0 \quad x(T_{end}) = x_{end}$$

$$q_x(0) = 0 \quad q_x(T_{end}) = 0$$

$$y(0) = y_0 \quad y(T_{end}) = Y_{end}$$

$$\dot{x}(0) = 0 \quad \dot{x}(T_{end}) = 0$$

$$\dot{q}_x(0) = 0 \quad \dot{q}_x(T_{end}) = 0$$

$$\dot{y}(0) = 0 \quad \dot{y}(T_{end}) = 0$$

$$F_x(0) = 0 \quad F_x(T_{end}) = 0$$

$$F_y(0) = m_h g \quad F_y(T_{end}) = m_h g$$

$M_h$ . . . weight of the lifting unit
$x(0)$ and $x(T_{end})$ . . . start and target position of the displacement unit
$y(0)$ and $y(T_{end})$ . . . start and target position of the lifting unit
$F_x(0)$ and $F_x(T_{end})$ . . . positioning force at the displacement unit in the start and target position
$F_y(0)$ and $F_y(T_{end})$ . . . positioning force on the lifting unit in the start and target position
$q_x(0)$ and $q_x(T_{end})$ . . . mast deflection in the start and target position in the x-direction
$\dot{x}(0)$ and $\dot{x}(T_{end})$ . . . travel speed of the displacement unit in the start and target position
$\dot{y}(0)$ and $\dot{y}(T_{end})$ . . . travel speed of the lifting unit in the start and target position
$\dot{q}_x(0)$ and $\dot{q}_x(T_{end})$ . . . mast deflection speed in the start and target position in the x-direction On this premise, the reference trajectories are planned so that at the instant the deceleration phase ends and on reaching the target position, the mast deflection $q_x$ and its velocity $\dot{q}_x$ are zero. It is also of advantage to select the positioning force $F_x = 0$ in the start and target positions and of advantage if the positioning force $F_y$ corresponds to the static value, thereby avoiding any jumps in force at the start and end of an operating path. This places less stress on the mechanical system and the displacement and lifting drives 7, 17.

The bay operating device, in particular the displacement and lifting units 4, 8, are moved during travel between the start position and target position, taking account of the mechanical and dynamic threshold values, such as drive torque, motor speed, mast deflection, mast base bending stress and such like, always at a maximum travel speed, acceleration and maximum permissible positioning force $F_x$, $F_y$. In other words, the displacement and lifting unit 4, 8 is respectively moved from the start position at a maximum positioning force $F_x$, $F_y$ limited by the threshold values and then accelerated and decelerated to a maximum negative positioning force $F_x$, $F_y$ limited by the threshold values. As a result, the bay operating device is always moved at the maximum possible travel speed or acceleration, thereby permitting a time-minimized positioning of the bay operating system in the start and/or target position.

Figure 3:
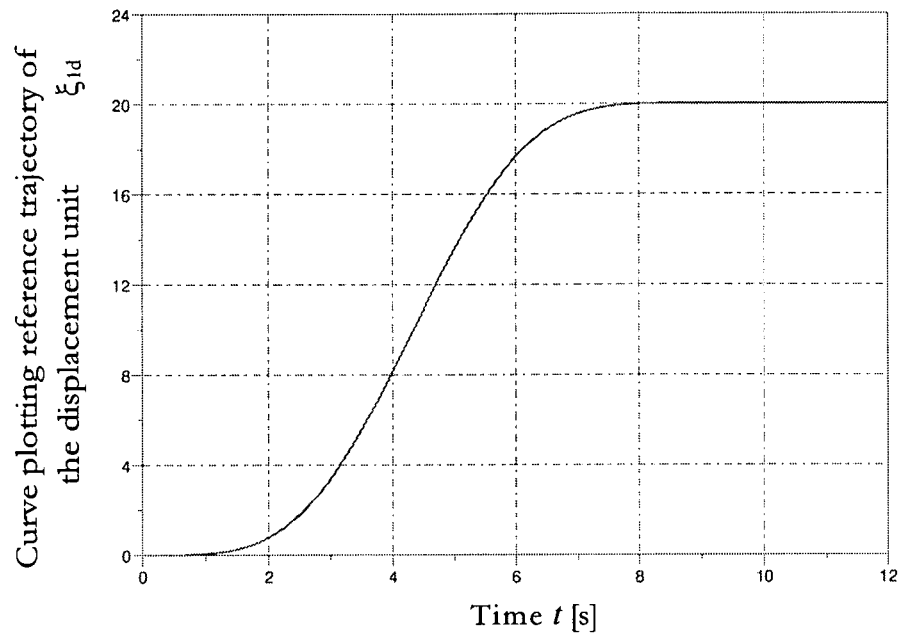
FIG. 3 is a diagram of the time curve of the first, flat output serving as a reference trajectory of a displacement unit of the load handling device.
Figure 4:
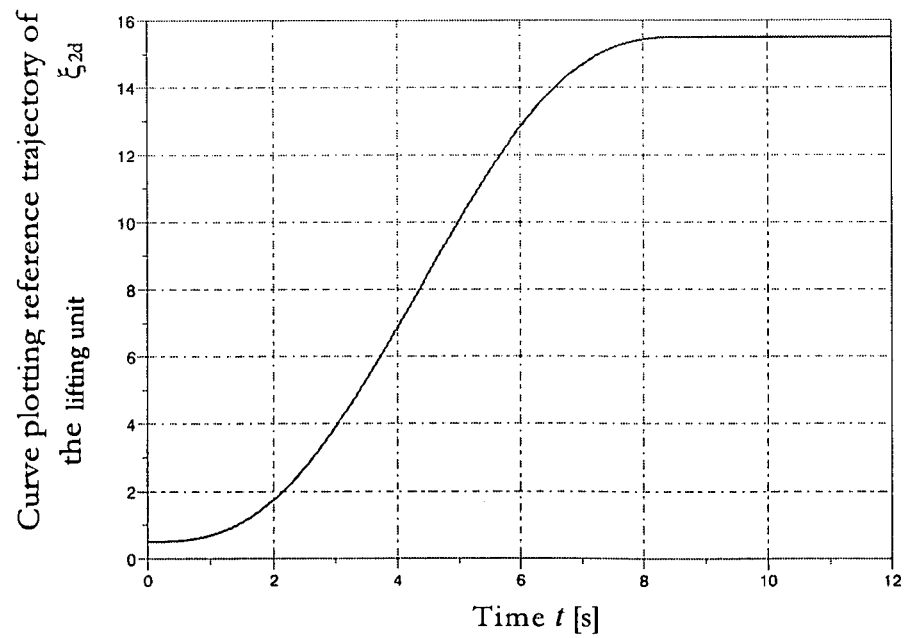
FIG. 4 is a diagram of the time curve of the second, flat output serving as a reference trajectory of a lifting unit of the load handling device.

In this embodiment, the planned reference trajectories illustrated in FIGS. 3 and 4 act on the bay operating device in such a way that the deceleration phase immediately follows the acceleration phase. This being the case, the bay operating device is accelerated and decelerated so that during the switch from the maximum acceleration in the acceleration phase to a negative maximum acceleration in the deceleration phase, the mast 6 completes only a single vibration period in the x-direction from a negative bending to a positive bending, and on termination of the deceleration phase, the bay operating device is positioned in the target position free of vibration. In other words, a vibration-free positioning of the lifting unit 8 can be achieved at least in the target position. This is achieved due to the fact that the mast deflection and its velocity are set to zero in the start and/or target position and the reference and desired trajectories are planned and calculated so that this condition is fulfilled. This advantageously means that the mast 6 may be designed with a thin wall or the mast height may be higher whilst retaining the same, conducive dynamic behavior.

By planning the reference trajectories accordingly, it is possible to set up any travel curve, including, for example, a constant travel between the acceleration and deceleration phases over long travel paths in the x- and/or y-direction of the bay operating system.

Figure 10:
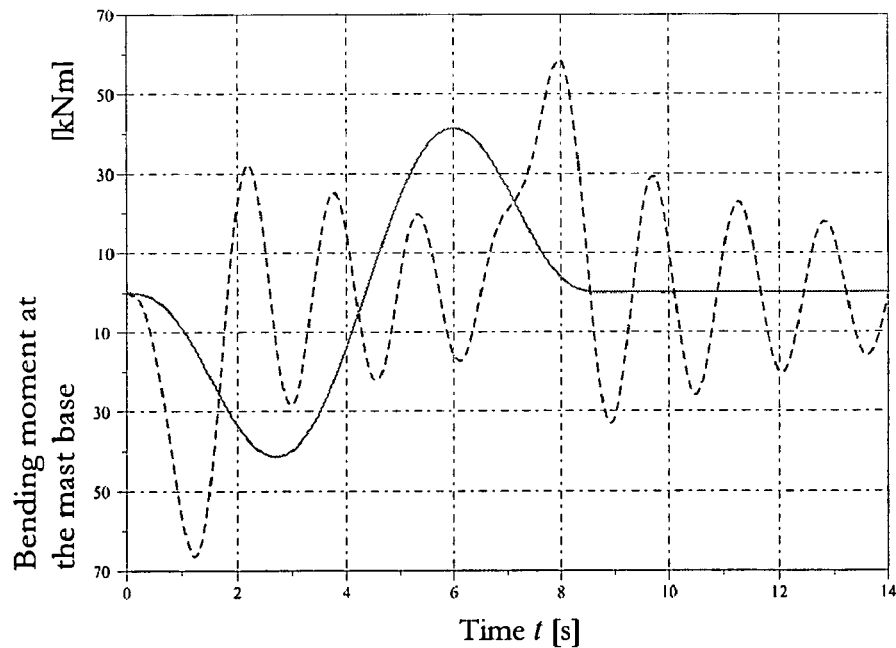
FIG. 10 shows curves plotting the bending moment at the mast base in the x-direction to provide a comparison between control of the load handling device with a flatness-based control shown by a solid line and a conventional control of the load handling device shown by a broken line.

The positive effect achieved as a result is illustrated in FIGS. 9 and 10. In FIG. 9, time (t) is plotted in seconds on the x-axis of the diagram, and bending or mast deflection of the mast tip is plotted in millimeters on the y-axis. The curve plotted in broken lines shows the time curve of mast deflection of a position control system known from the prior art without vibration damping. The curve plotted by a solid line represents the time curve of mast deflection using "flatness based control". In FIG. 10, time (t) is plotted in seconds on the x-axis of the diagram, and the bending moment at the mast base is plotted in kNm on the y-axis. The curve plotted by a broken line represents the time curve of the bending moment at the mast base of a position control system without vibration damping known from the prior art. The curve plotted by a solid line represents the time curve of the bending moment at the mast base using "flatness based control".

If, for example, the displacement unit 4 has to be moved from the start position $x(0)=0$ m into the target position $x(T_{end})=20$ m and the lifting unit 8 has to be moved from the start position $y(0)=0, 5$ m into the target position $y(T_{end})=15, 5$ m at a maximum acceleration or speed, the time curves representing the bending or mast deflection of the mast tip and the bending moment at the mast base will be those illustrated in FIGS. 9 and 10. The travel time between the start and target positions corresponds to $T_{end}$ and is selected so as to be 8.2 sec for example, so that the threshold values are complied with or there is a slight drop below them.

Figure 11:
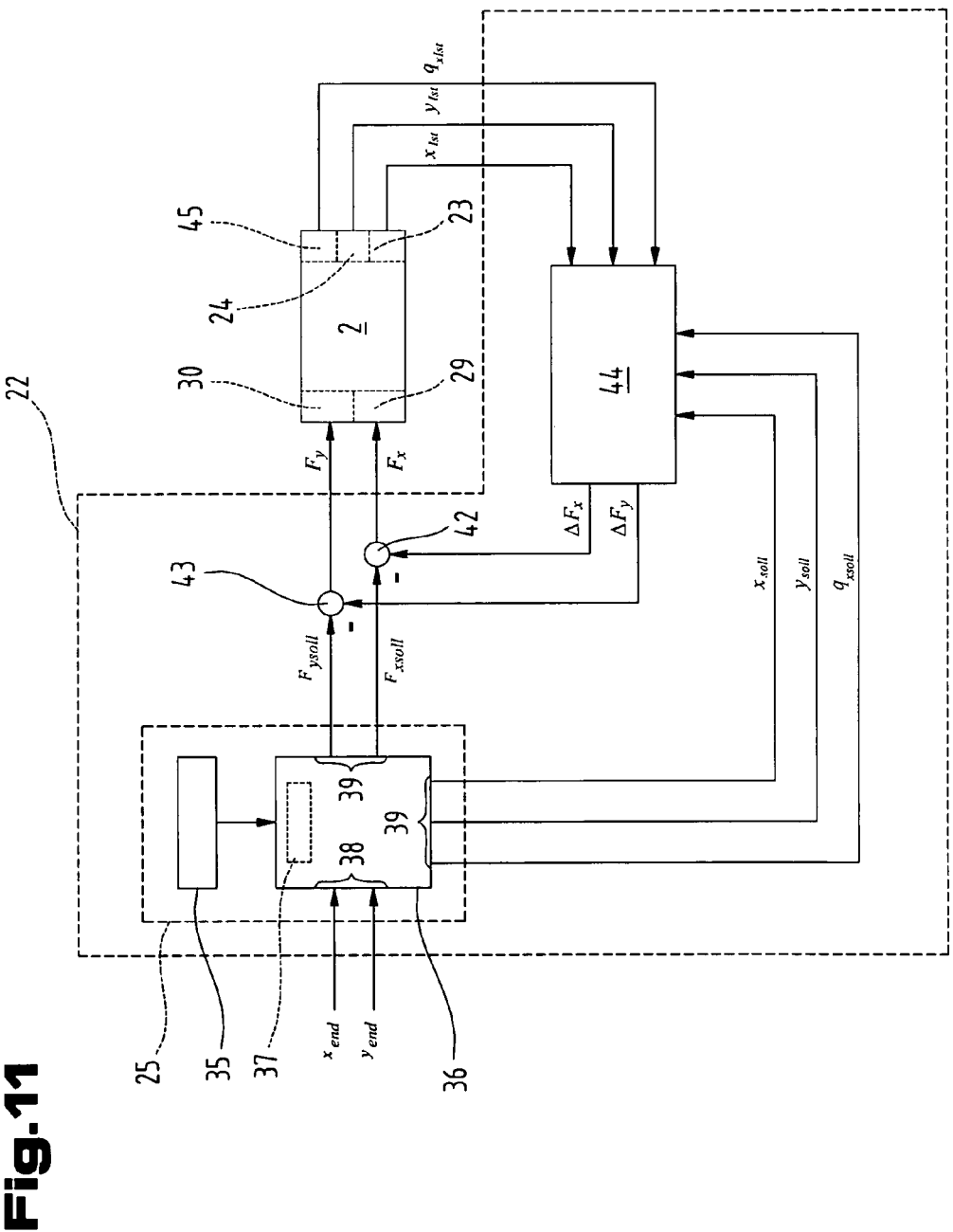
FIG. 11 is a block diagram illustrating another embodiment of a position control system proposed by the invention.

FIG. 11 is a block diagram illustrating a modified position control system 22 for the load handling device 2 illustrated in FIG. 1. It comprises the servo-control system 25 described above but, unlike the embodiment illustrated in FIG. 2, only one controller 44, which receives the desired trajectories for the system variables and the time curve of the desired positions of the displacement and lifting unit 4, 8 constituting them as well as the dynamic deformations of the load handling device 2 from the servo-control system 25. The desired positioning forces $F_{xsoll}$, $F_{ysoll}$, desired positions $x_{soll}$, $y_{soll}$ as well as the desired mast bending $q_{xsoll}$ are forwarded to the control outputs 39 and on to the position control system for the displacement and lifting unit 4, 8. The dynamic deformations are again calculated in the manner described above using the mathematical model of the "flatness based control system", whereby the time curves of the dynamic deformations are calculated from the reference trajectories describing the system behavior of the load handling device 2 and forwarded to the controller 44 as the desired trajectory. In this embodiment, the desired trajectory for the dynamic deformations of the load handling device 2 is determined, in particular the desired bending $q_{xsoll}$ of the mast 6.

As indicated by dotted-dashed lines in FIG. 1, a measuring sensor 45 is mounted on the mast 6, for example in the region of the mast base on a front or rear mast wall in the direction of travel (x-direction) of the bay operating system, serving as an actual value transmitter for detecting the mast bending moment. The measuring sensor 45 is a strain gauge or piezoresistive sensor, for example, and its circuitry is connected to the position control system 22. From the detected actual values of the mast bending moment, the velocity of the mast bending moment $\dot{q}_x$ can be calculated and from it, a conclusion can be drawn about the mast vibrations and the time curve representing bending of the mast 6. The time curve of the actual values of the system variables and the predefined desired trajectories of the system variables and the desired and actual values of the bending $q_{xsoll}$, $q_{xIst}$ of the mast 6 are in turn forwarded to a comparator element, not illustrated, which calculates a control variance which is applied to the controller 44. Using the control variance between the desired position $x_{soll}$, $y_{soll}$ and the actual position $x_{Ist}$, $y_{Ist}$ as well as the control variance between desired bending and actual bending $q_{xsoll}$, $q_{xIst}$ of the mast 6, the controller 44 in turn calculates the interference variable based on a set rule of law, in particular the differential force $\Delta F_x$, $\Delta F_y$, which is respectively forwarded to a comparator element 42, 43 connected downstream of the controller 44, where the desired positioning forces $F_{xsoll}$, $F_{ysoll}$ are compared, and the desired positioning forces $F_{xsoll}$, $F_{ysoll}$ are applied and instantaneous positioning forces $F_x$, $F_y$ determined. The advantage of this embodiment is that positioning variances of the lifting unit 8 in the start or target position relative to the actual positions due to load conditions detected by the distance measuring systems 23, 24 can be automatically corrected.

Figure 12:
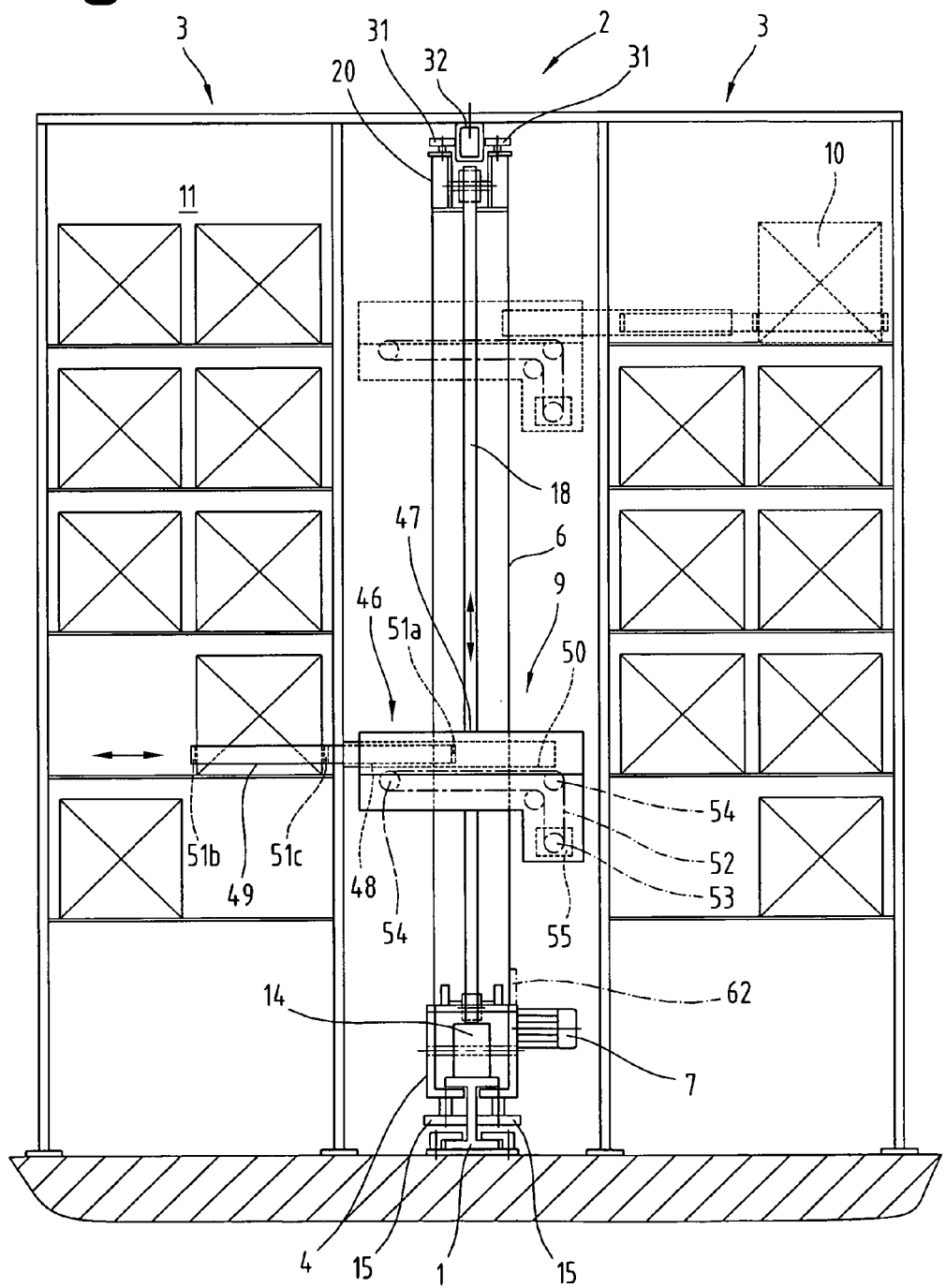
FIG. 12 is a schematic diagram from a front view showing the high-bay racking system illustrated in FIG. 1 with the load handling device and the loading and unloading device disposed on it in different operating positions.

FIG. 12 illustrates a view in elevation of the high-bay racking system shown in FIG. 1 with the load handling device 2 which can be displaced along the tracks in the aisle (x-direction) and the high-bay racks 3 disposed at a distance apart from one another on either side of the aisle. The load handling device 2 comprises the lifting unit 8 which can be moved vertically in the y-direction and the loading and unloading device 9 disposed on it. In the embodiment illustrated as an example here, the loading and unloading device 9 comprises two telescopic arms 46 which can be synchronously extracted in the z-direction—as indicated by the double arrow. The z-direction extends perpendicular to the longitudinal extension of the aisle or x-direction. The telescopic arms 46 each comprise two support frames 47 mounted on the lifting unit 8 for example, at least one middle slide 48, at least one top slide 49 and at least one drive means 50, preferably disposed on the middle slide 48, for example a toothed rack, although this is not illustrated in detail. The top slides 49 are provided with driving elements 51a, 51b, 51c at their oppositely lying ends and in the middle portion which can be moved from a non-operating position into an operating position. In the non-operating position, the driving elements 51a, 51b, 51c are moved into a recess disposed inside the external contour of the top slide 49 and in the operating position into a position overlapping the freight object 10, so that the freight object 10 can be pushed between a platform of the lifting unit 8 and a rack compartment 11. The driving elements 51a, 51b, 51c are preferably each mounted so as to be pivotable about an axis extending parallel with the longitudinal extension of the telescopic arms 46 between the non-operating and operating position on the top slide 49.

The middle and top slides 48, 49 can be displaced relative to the support frame 47 and relative to one another. Each middle slide 48 is drivingly connected to a drive element 52, for example an endlessly circulating traction means, such as a chain or belt drive, and a top strand of the endlessly circulating drive element 52 and the drive means 50 positively engage with one another and transmit a driving force to the telescopic arms 46. The endless drive elements 52 are respectively guided around a driving gear 53 and several output gears 54 and are synchronously driven by means of at least one actuator drive 55. Although not illustrated, the support frame 47 and top slide 49 of each telescopic arm 46 are coupled with one another by two belts, and the belts are respectively deflected around rollers mounted at the oppositely lying ends of the middle slides 48 and are secured by means of a first free end to the support frame 47 and by a second free end to the top slide 49. The two driving gears 53 are preferably coupled via an articulated shaft to the common actuator drive 55, although this is not illustrated.

For a more detailed description of the telescopic arms 46 of the loading and unloading device 9, reference may be made to the detailed description given in patent specification US 2003/0185656 A1 which is incorporated in this disclosure by way of reference.

Figure 13:
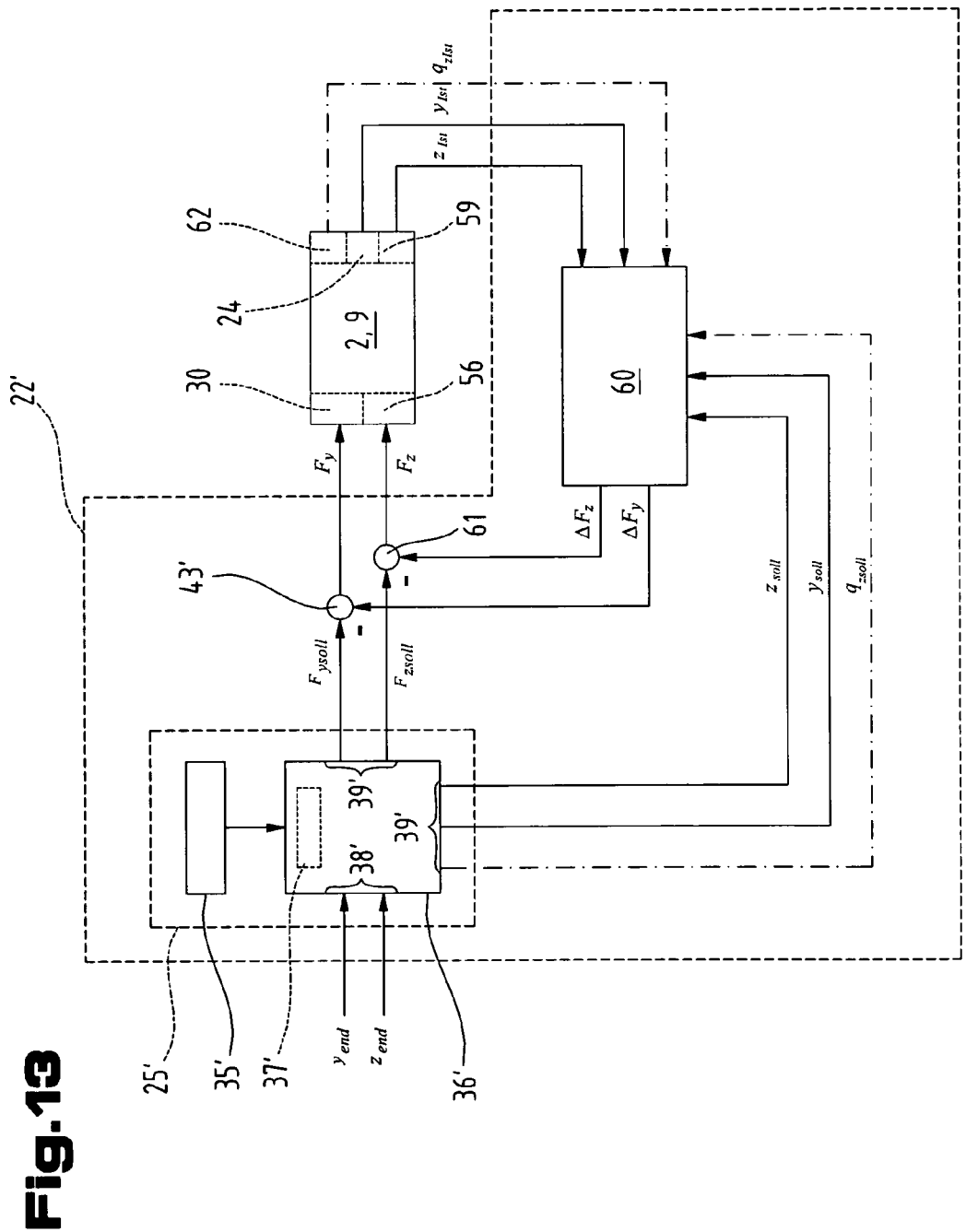
FIG. 13 is a block diagram illustrating a position control system for the loading and unloading device illustrated in FIG. 12.

The actuator drive 55 is an electric motor, such as an asynchronous motor, servo-motor or stepper motor, for example, and is activated by an actuator member 56 schematically indicated in FIGS. 1 and 13 and supplied with voltage in order to control the motor speed and its travel speed. The actuator member 56 is provided in the form of a variable-frequency inverter, servo-amplifiers, step-by-step amplifiers, current converters and such like, for example, which are an integral part of the position control system and connected to it by their circuitry.

The loading and unloading device 9 can be deposited with the aid of the lifting unit 8 of the load handling device 2 in the x- and y-target positions in the region of any selectable rack compartment 11 of the high-bay rack 3 on the one hand and on an incoming conveyor system and/or outgoing conveyor system co-operating with it, on the other hand, although this is not illustrated.

As may be seen by comparing FIGS. 1 and 12, several freight objects 10, for example containers, boxes, can be deposited in the rack compartments 11 in the z-direction (loading and unloading direction of the freight object 10), oriented centrally with respect to one another one behind the other in a row. By means of the loading and unloading device 9, in particular the telescopic arms 46, it is possible to travel to at least two depth positions in the z-direction starting from the aisle from one of the high-bay racks 3 disposed on either side of it, and this is the case irrespective of whether the freight object 10 adjacent to the aisle indicated by solid lines or the freight object 10 remote from the aisle indicated by broken lines has to be deposited or removed.

Within the context of the invention, it is also possible for the loading and unloading device 9 to be provided in the form of a mobile transport vehicle, which is provided with the actuator drive 55 as a means of initiating the traveling movement of the lifting unit 8. Such a transport vehicle is disclosed in patent specifications WO 03/004385 A2 or DE 43 30 795 A1, for example.

The fact that the described high-bay racking system must be economically viable means that the dynamic behavior of the load handling device 2 must be optimized. This optimization is not limited to just the traveling movements of the load handling device 2 in the aisle direction (x-direction) and of the lifting unit 8 in the vertical direction (y-direction), but is also defined to a significant degree by the displacement of the loading and unloading device 9 in the loading and unloading direction (z-direction). Even though the load handling device 2 is laterally guided on the guide tracks 1, 32 by the bottom and top displacement unit 4, 20, as the displacement speed or acceleration values of the loading and unloading device 9 increase during the inward and outward movement relative to the stationary lifting unit 8, but also depending on the weight of the freight object 10 to be transported, vibrations can be created at the load handling device 2, especially the mast 6, in the z-direction, which are also transmitted to the loading and unloading device 9. When the lifting unit 8 reaches the position more or less at half the mast height, the amplitude of the vibrations reaches it maximum and leads to dynamic deformations of the load handling device 2 as well as detrimental stress on the vertical and lateral guide rollers 14, 15, 31.

In order to counteract this problem, a method and a position control system are proposed below which suppress any tendency of the load handling device 2 to vibrate when it is operating, especially the mast 6, and enable the loading and unloading device 9 to be positioned exactly in the z-direction at a start and a target position in the shortest time.

FIG. 13 is a circuit diagram of the position control system 22' of the loading and unloading device 9 illustrated in FIGS. 1 and 12. The position control system 22' comprises the servo-control system 25', which in turn comprises at least one memory 35' and at least one computer module 36', in particular a microprocessor, with a logic system 37', in particular a program logic, control inputs 38' and control outputs 39'. The circuitry of the memory 35' is connected to the microprocessor so that its memory contents can be supplied to the microprocessor. The memory 35' might just as easily be integrated in the computer module 36'. The control inputs 38' are connected to the master computer and receive the target positions $y_{end}$, $z_{end}$ to which the lifting unit 8 and loading and unloading device 9 are to be moved.

The memory 35' contains the reference trajectories adapted to a type of loading and unloading device 9 and load handling device 2, in particular the lifting unit 8, serving as a mathematical function, as will be described in more detail below, as well as mechanical and/or dynamic threshold values and parameters of the loading and unloading device 9 and load handling device 2, which can be retrieved. The mechanical and/or dynamic threshold values relate to the maximum permissible weight of the freight object 10 to be deposited in the rack compartment 11 or removed from the rack compartment 11, the maximum amplitude of the deflection of the mast 6 in the z-direction caused by vibrations, the maximum positioning force on the loading and unloading device 9 and such like for example.

The reference trajectories each describe an optimum time curve of the system behavior of the loading and unloading device 9 and load handling device 2, which is calculated on the basis of mathematical equation systems. The system behavior is defined by the maximum permissible, mechanical und dynamic loads/threshold values of the loading and unloading device 9 and/or load handling device 2 as well as the time-minimized movement of the loading and unloading device 9 from a start position to a target position and is described in a mathematical model for determining the reference trajectories.

The reference trajectories are forwarded from the memory 35' via a line to the computer module 36'. The start position of the loading and unloading device 9 is reached when the lifting unit 8 has reached its target positions in the x- and y-direction and has come to a standstill there and the loading and unloading device 9, in particular the telescopic arms 46, has been moved into its basic position more or less centrally on the lifting unit 8. The target position $z_{end}$ predefined by the master computer corresponds to the first or second depth position of the extracted loading and unloading device 9 at the depositing place next to the aisle or remote from the aisle.

The target positions $y_{end}$ und $z_{end}$ predefined by the master computer are therefore forwarded to the computer module 36' of the servo-control system 25' at the control inputs 38', where, based on the at least one reference trajectory $\xi_{2d}$ (FIG. 15), preferably both reference trajectories $\xi_{1d}, \xi_{2d}$ (see FIGS. 14 and 15) read from the memory 35', the actual or start positions $y_{Ist}, z_{Ist}$ and the target positions $y_{end}, z_{end}$, the desired trajectories for the system variables, at least the desired positioning forces $F_{ysoll}, F_{zsoll}$ (see FIGS. 16 and 17) and desired positions $y_{soll}, z_{soll}$ (see FIGS. 18 and 19) for the lifting unit 8 and loading and unloading device 9 and their lifting und actuator drives 7, 55 are calculated using an appropriate algorithm, and the desired positioning forces $F_{ysoll}$, $F_{zsoll}$ and desired position $y_{soll}, z_{soll}$ are forwarded to the control outputs 39' and on to the position control circuit for the loading and unloading device 9.

This position control circuit comprises a controller 60, which may be a PD-controller for example. By means of this controller 60, interference variables not taken into account when planning the reference trajectories, such as the friction which occurs when pushing a freight object 10 between the lifting unit 8 and the rack compartment 11 or the load of a freight object 10 caused by another conveying characteristic and such like for example, can be controlled in a simple manner. This is important if the freight object 10 is a container containing an item which might shift whilst the container is being manipulated between the lifting unit 8 and the rack compartment 11, which can cause the container to move relative to the loading and unloading device 9.

Advantageously, only the variances which occur due to external interference factors have to be controlled by the controller 60, whilst the main time curves of at least the system variables $F_{ysoll}, F_{zsoll}, y_{soll}, z_{soll}$, are predefined by the respectively calculated trajectory curve. The desired velocities $v_{ysoll}, v_{zsoll}$ as system variables and their desired trajectories (not illustrated) are obtained from the first derivative of the desired positions $y_{soll}, z_{soll}$ as a function of time.

By controlling the lifting unit 8 and loading and unloading device 9 and their lifting und actuator drives 7, 55 along predefined desired trajectories, a vibration of the mast 6 or a mast deflection in the z-direction as the loading and unloading device 9 is being positioned in the start and target positions can be suppressed, as illustrated in FIG. 20.

By means of the controller 60, it is not only possible to move exactly to the target positions $y_{end}, z_{end}$ predefined by the warehouse management system, but also variances from the desired trajectories caused by the induced by interference factors can be compensated because the correction between the time curve of the actual values of the system variables and the predefined desired trajectories of the system variables also results in a stabilization of the desired trajectories.

Although not illustrated, a respective comparator element is connected upstream of the controller 60 for the lifting unit 8 and loading and unloading device 9, at which a control variance between measured actual values of the system variables (actual trajectories) and set desired trajectories of the system variables, in particular the desired position $y_{soll}, z_{soll}$ and the actual position $y_{Ist}, z_{Ist}$ are calculated. The actual values $z_{Ist}$ for the inward and outward travel of the loading and unloading device 9 are constantly detected by means of a distance measuring system 59. It is provided in the form of a rotary or incremental transmitter and such like coupled with the actuator drive 55. The controller 60 receives the control variances. From the control variances, an interference variable, in particular a differential force $\Delta F_y, \Delta F_z$, is calculated using a fixed rule of law, which is forwarded to a comparator element 43', 61 connected downstream of the controller 60 with a view to overriding the interference variable and is superimposed on the set desired trajectories of the system variables, in particular the desired positioning forces $F_{ysoll}$, $F_{zsoll}$ as a correction value and current positioning forces $F_y$, $F_z$ are determined. The actuator members 30, 56 of the lifting and actuator drives 7, 55 receive the corrected positioning forces $F_y, F_z$ from the desired-actual comparison of the desired trajectories for the system variables, in particular the desired positioning forces $F_{ysoll}, F_{zsoll}$, and the interference variable, in particular the differential forces $\Delta F_y, \Delta F_z$. The variances described above caused by interference factors are corrected or compensated by means of the differential force $\Delta F_y, \Delta F_z$. Accordingly, the interference variable, in particular the differential force $\Delta F_y, \Delta F_z$, corresponds to a correction factor for the interference factors.

The current positioning forces $F_y, F_z$ are converted by means of the actuator members 30, 56 of the lifting and actuator drives 7, 55, for example the variable-frequency inverter, into a voltage of corresponding frequency, by means of which the asynchronous motors are accelerated or decelerated to a speed proportional to the frequency, for example. The actuator members 30, 56 receive the current positioning forces $F_y, F_z$.

As indicated by broken lines in FIG. 13, another desired trajectory for the system variable of the dynamic deformation of the load handling device 2, in particular the desired mast bending $q_{zsoll}$ in the z-direction, can be set by the servo-control system 25' and applied to the controller 60. The dynamic deformations of the mast 6 are in turn calculated using the mathematical model of the "flatness-based control", after which the time curves of the dynamic deformations are calculated as the desired trajectory from the reference trajectory/trajectories describing the system behavior of the loading and unloading device 9 and/or load handling device 2.

The time curve of the actual values of the system variable and the bending $q_{zIst}$ of the mast 6 in the z-direction constituting it is detected by means of a measuring sensor 62 serving as an actual value transmitter. The measuring sensor 62 is a strain gauge or piezoresistive sensor, for example, the circuitry of which is connected to the position control system 22', and disposed on the mast 6, for example in the region of the mast base on a front or rear mast wall in the inward and outward direction of movement of the loading and unloading device 9, as indicated by broken lines in FIG. 12. The velocity of the mast bending moment $\dot{q}_z$ can be calculated from the detected actual values $q_{zIst}$ of the mast bending moment in the z-direction and from it the mast vibrations, and a conclusion drawn about the time curve of the bending of the mast 6 in the z-direction.

The time curve of the actual values of the system variables $y_{lst}$, $z_{lst}$, $q_{zlst}$ (actual trajectories) and the predefined desired trajectories of the system variables $y_{soll}$, $z_{soll}$, $q_{zsoll}$ are in turn forwarded to the comparator elements, not illustrated, which calculate a control variance which is applied to the controller 60. From the control variance between the desired position $y_{soll}$, $z_{soll}$ and actual position $y_{lst}$, $z_{lst}$ as well as the control variance between the desired bending $q_{zsoll}$ and the actual bending $q_{zlst}$ of the mast 6, the controller 60 then uses a set rule of law to calculate the interference variable, in particular the differential force $\Delta F_y$, $\Delta F_z$, which is respectively forwarded to a comparator element 43', 61 connected downstream of the controller 60, compared with the desired positioning forces $F_{ysoll}$, $F_{zsoll}$ and superimposed on the desired positioning forces $F_{ysoll}$, $F_{zsoll}$ and current positioning forces $F_y$, $F_z$ are determined. The advantage of this embodiment is that positioning or angular variances $\Delta\phi$ of a support plane for the freight object 10 and the lifting unit 8 from the horizontal in the start or target position due to load-induced bending of the mast 6 can also be automatically corrected.

A description will now be given below of how the reference trajectories to take account of the loading and unloading device 9 and load handling device 2 are calculated using the principle of "flatness based control".

The system behavior of the bay operating system in the second model for the y- and z-direction is also described by a partial differential equation system, which can in turn be trans-formed by the approximation method of Ritz, for example, into a standard differential equation system in the form $$M(q)\ddot{q} + K(q,\dot{q}) = Q$$

This model is again the output point for planning the "flatness based control". This plan model is also used to define the optimum curve of the reference trajectories whilst conforming to the mechanical and dynamic threshold values described above.

The above-mentioned differential equation may be rewritten in the status space in a system of non-linear differential equations $$\dot{\bar{x}} = f(\bar{x},\bar{u})$$

$$\bar{y} = h(\bar{x},\bar{u})$$

The status variables in the vector are:

$$\bar{x} = \begin{pmatrix} y \\ v_y \\ z \\ v_z \\ q_z \\ v_{q_z} \\ \varphi \\ v_\varphi \end{pmatrix}$$

$y$ ... position of the freight object in the vertical direction $v_y$ ... velocity of the freight object in the vertical direction $z$ ... position of the freight object in the z-direction $v_z$ ... velocity of the freight object in the z-direction -continued $q_z$ ... mast deflection in the z-direction $v_{q_z}$ ... velocity of the mast deflection in the z-direction $\varphi$ ... angle of the lifting unit with respect to the horizontal $v_\varphi$ ... angular velocity of the lifting unit The status variables are variables with the property whereby the system output $\bar{y}$ is unambiguously set by the curve of $\bar{x}(t_0)$ starting from a start point to and the values of.

The input variables are:

$$\bar{u} = \begin{pmatrix} F_y \\ F_z \end{pmatrix}$$

$F_y$ ... positioning force on the lifting unit to lift the freight object $F_z$ ... positioning force on the actuator drive of the loading and unloading device The output variables in the vector are:

$$\bar{y} = \begin{pmatrix} x \\ y \\ q_z \end{pmatrix}$$

$y$ ... position of the freight object in the vertical direction $z$ ... position of the freight object in the z-direction $q_z$ ... mast deflection in the z-direction The output variables enable the behavior of the system to be observed. If they can be detected by measuring systems, they are also referred to as measurement variables (control variables). If they can not be obtained using measuring technology, they are nevertheless needed for the control process and can therefore be estimated by an observer. In the case of the bay operating device, the output variables can be detected using measuring technology and forwarded to the position control circuit, as can the actual values of the z-position and/or the velocity $v_z$ of the freight object 10, the actual values of the y-position and/or the velocity $v_y$ of the freight object 10 and mast bending in the z-direction $q_z$.

Since the property of flatness can be demonstrated for the mathematical model of the bay operating systems as the loading and unloading device 9 is moved in and out, there exist variables, also referred to as flat outputs $\xi_1(\bar{x})$ und $\xi_2(\bar{x})$ $\xi_1(\bar{x})$ ... first flat output $\xi_2(\bar{x})$ ... second flat output which can in turn be expressed by the status variables, with the property whereby all the system variables can be expressed by these flat outputs and their time derivatives.

$$y = y(\xi_1, \dot{\xi}_1, \ddot{\xi}_1, \ldots, \xi_1^{(\lambda 1)}, \xi_2, \dot{\xi}_2, \ddot{\xi}_2, \ldots, \xi_2^{(\lambda 2)})$$

$$v_y = v_y(\xi_1, \dot{\xi}_1, \ddot{\xi}_1, \ldots, \xi_1^{(\kappa 1)}, \xi_2, \dot{\xi}_2, \ddot{\xi}_2, \ldots, \xi_2^{(\kappa 2)})$$

$$z = z(\xi_1, \dot{\xi}_1, \ddot{\xi}_1, \ldots, \xi_1^{(\alpha 1)}, \xi_2, \dot{\xi}_2, \ddot{\xi}_2, \ldots, \xi_2^{(\alpha 2)})$$

$$v_z = v_z(\xi_1, \dot{\xi}_1, \ddot{\xi}_1, \ldots, \xi_1^{(\beta 1)}, \xi_2, \dot{\xi}_2, \ddot{\xi}_2, \ldots, \xi_2^{(\beta 2)})$$

$$q_z = q_z(\xi_1, \dot{\xi}_1, \ddot{\xi}_1, \ldots, \xi_1^{(\chi 1)}, \xi_2, \dot{\xi}_2, \ddot{\xi}_2, \ldots, \xi_2^{(\chi 2)})$$

$$v_{q_x} = v_{q_x}(\xi_1, \dot{\xi}_1, \ddot{\xi}_1, \ldots, \xi_1^{(\delta 1)}, \xi_2, \dot{\xi}_2, \ddot{\xi}_2, \ldots, \xi_2^{(\delta 2)})$$

$$\phi = \phi(\xi_1, \dot{\xi}_1, \ddot{\xi}_1, \ldots, \xi_1^{(\epsilon 1)}, \xi_2, \dot{\xi}_2, \ddot{\xi}_2, \ldots, \xi_2^{(\epsilon 2)})$$

$$v_\phi = v_\phi(\xi_1, \dot{\xi}_1, \ddot{\xi}_1, \ldots, \xi_1^{(\phi 1)}, \xi_2, \dot{\xi}_2, \ddot{\xi}_2, \ldots, \xi_2^{(\phi 2)})$$

$$F_y = F_y(\xi_1, \dot{\xi}_1, \ddot{\xi}_1, \ldots, \xi_1^{(\gamma 1)}, \xi_2, \dot{\xi}_2, \ddot{\xi}_2, \ldots, \xi_2^{(\gamma 2)})$$

$$F_z = F_z(\xi_1, \dot{\xi}_1, \ddot{\xi}_1, \ldots, \xi_1^{(\phi 1)}, \xi_2, \dot{\xi}_2, \ddot{\xi}_2, \ldots, \xi_2^{(\phi 2)})$$

The desired trajectories of the system variables for controlling the bay operating system are determined from these equations by predefining the time curve of the variables $\xi_{1d}(t)$ and $\xi_{2d}(t)$ without having to solve a differential equation system. This is important because a non-linear system such as also describes the dynamic behavior of the bay operating system and the inward and outward movement of the loading and unloading device 9 can not be solved generally speaking and in these instances, there is no other way of calculating back to the input variables without integrating.

The desired trajectories of the system variables therefore result in the following $$y_d = y(\xi_{1d}, \dot{\xi}_{1d}, \ddot{\xi}_{1d}, \ldots, \xi_{1d}^{(\lambda 1)}, \xi_{2d}, \dot{\xi}_{2d}, \ddot{\xi}_{2d}, \ldots, \xi_{2d}^{(\lambda 2)})$$

$$v_{yd} = v_y(\xi_{1d}, \dot{\xi}_{1d}, \ddot{\xi}_{1d}, \ldots, \xi_{1d}^{(\kappa 1)}, \xi_{2d}, \dot{\xi}_{2d}, \ddot{\xi}_{2d}, \ldots, \xi_{2d}^{(\kappa 2)})$$

$$z_d = z(\xi_{1d}, \dot{\xi}_{1d}, \ddot{\xi}_{1d}, \ldots, \xi_{1d}^{(\alpha 1)}, \xi_{2d}, \dot{\xi}_{2d}, \ddot{\xi}_{2d}, \ldots, \xi_{2d}^{(\alpha 2)})$$

$$v_{zd} = v_z(\xi_{1d}, \dot{\xi}_{1d}, \ddot{\xi}_{1d}, \ldots, \xi_{1d}^{(\beta 1)}, \xi_{2d}, \dot{\xi}_{2d}, \ddot{\xi}_{2d}, \ldots, \xi_{2d}^{(\beta 2)})$$

$$q_{zd} = q_{1z}(\xi_{1d}, \dot{\xi}_{1d}, \ddot{\xi}_{1d}, \ldots, \xi_{1d}^{(\chi 1)}, \xi_{2d}, \dot{\xi}_{2d}, \ddot{\xi}_{2d}, \ldots, \xi_{2d}^{(\chi 2)})$$

$$v_{qzd} = v_{q1z}(\xi_{1d}, \dot{\xi}_{1d}, \ddot{\xi}_{1d}, \ldots, \xi_{1d}^{(\delta 1)}, \xi_{2d}, \dot{\xi}_{2d}, \ddot{\xi}_{2d}, \ldots, \xi_{2d}^{(\delta 2)})$$

$$\phi_d = \phi(\xi_{1d}, \dot{\xi}_{1d}, \ddot{\xi}_{1d}, \ldots, \xi_{1d}^{(\epsilon 1)}, \xi_{2d}, \dot{\xi}_{2d}, \ddot{\xi}_{2d}, \ldots, \xi_{2d}^{(\epsilon 2)})$$

$$v_{\phi d} = v_\phi(\xi_{1d}, \dot{\xi}_{1d}, \ddot{\xi}_{1d}, \ldots, \xi_{1d}^{(\phi 1)}, \xi_{2d}, \dot{\xi}_{2d}, \ddot{\xi}_{2d}, \ldots, \xi_{2d}^{(\phi 2)})$$

$$F_{yd} = F_h(\xi_{1d}, \dot{\xi}_{1d}, \ddot{\xi}_{1d}, \ldots, \xi_{1d}^{(\gamma 1)}, \xi_{2d}, \dot{\xi}_{2d}, \ddot{\xi}_{2d}, \ldots, \xi_{2d}^{(\gamma 2)})$$

$$F_{zd} = F_z(\xi_{1d}, \dot{\xi}_{1d}, \ddot{\xi}_{1d}, \ldots, \xi_{1d}^{(\phi 1)}, \xi_{2d}, \dot{\xi}_{2d}, \ddot{\xi}_{2d}, \ldots, \xi_{2d}^{(\phi 2)})$$

If the desired trajectories for the positioning variables, $F_{yd}(t)$ are now switched to the lift drive 7 of the lifting unit 8 and $F_{zd}(t)$ is switched through to the actuator drive 55 of the loading and unloading device 9, the loading and unloading device 9 and freight object 10 move exactly along these calculated system variables $\xi_{1d}(t)$ and $\xi_{2d}(t)$. The time curves are then also referred to as reference trajectories. In order to control the bay operating system, it is sufficient for the desired positioning forces $F_{ysoll}$, $F_{zsoll}$, the desired positions $y_{soll}$, $z_{soll}$ and/or the desired velocities $v_{ysoll}$ and $v_{zsoll}$ to be forwarded to the position control system 22'.

The reference trajectories are now planned taking account of the mechanical and/or dynamic threshold values of the bay operating system, for which purpose the start and end values for the start and target positions of the freight object 10 must be set first of all. What needs to be taken into account is the fact that the freight object 10 must be moved along the desired trajectories in infinite time from a stationary position in the start position into a stationary position in the target position, and not only the freight object 10 but also the mast 6 must be planned accordingly so as to be stationary and free of vibration in the target position.

This results in the following equations $$y(0) = y_0 \quad y(T_{end}) = y_{end}$$

$$z(0) = z_0 \quad z(T_{end}) = z_{end}$$

$$q_z(0) = 0 \quad q_z(T_{end}) = 0$$

$$\phi(0) = 0 \quad \phi(T_{end}) = 0$$

$$v_y(0) = 0 \quad v_y(T_{end}) = 0$$

$$v_z(0) = 0 \quad v_z(T_{end}) = 0$$

$$v_{qz}(0) = 0 \quad v_{qz}(T_{end}) = 0$$

$$v_\phi(0) = 0 \quad v_\phi(T_{end}) = 0$$

$$F_y(0) = m_h g \quad F_y(T_{end}) = m_h g$$

$$F_z(0) = 0 \quad F_z(T_{end}) = 0$$

$M_h$ . . . weight of lifting unit and freight object $z(0)$ and $z(T_{end})$ . . . start and target position of the freight object in the z-direction $y(0)$ and $y(T_{end})$ . . . start and target position of the freight object in the y-direction $\phi(0)$ and $\phi(T_{end})$ . . . start and target angle of the lifting unit $F_y(0)$ and $F_y(T_{end})$ . . . positioning force on the lifting unit and freight object in the y-direction in the start and target position $F_z(0)$ and $F_z(T_{end})$ . . . positioning force on the loading and unloading device and freight object in the start and target position in the z-direction $q_z(0)$ and $q_z(T_{end})$ . . . mast deflection in the start and target position in the z-direction $v_y(0)$ and $v_y(T_{end})$ . . . displacement speed of the lifting unit and the freight object in the start and target position in the y-direction $v_z(0)$ and $v_z(T_{end})$ . . . displacement speed of the loading and unloading device and the freight object in the start and target position in the z-direction $v_\phi(0)$ and $v_\phi(T_{end})$ . . . angular velocity of the lifting unit in the start and target position $v_{qz}(0)$ and $v_{qz}(T_{end})$ . . . mast deflection velocity in the start and target position in the z-direction As may be seen from these equations, the reference trajectories are planned so that at the instant at which the deceleration phase terminates and on reaching the target position, the mast deflection $q_z$ and its velocity $\dot{q}_z$ are set to zero. It is also of advantage to select the positioning force $F_z = 0$ in the start and target position and of advantage if the positioning force $F_y$ corresponds to the static value, thus avoiding jumps in forces at the start and end of an operating path.

Figure 17:
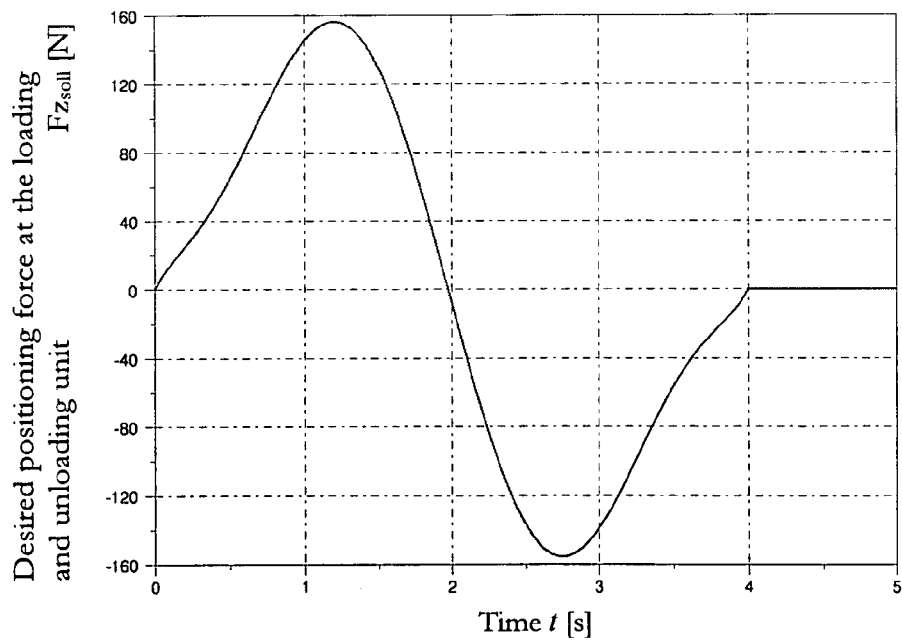
Figure 18:
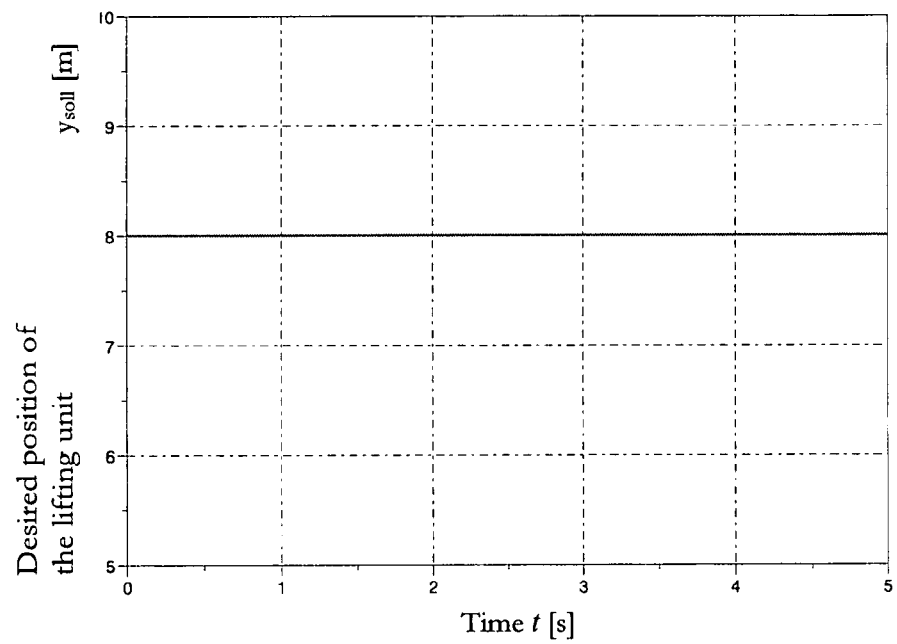
Figure 19:
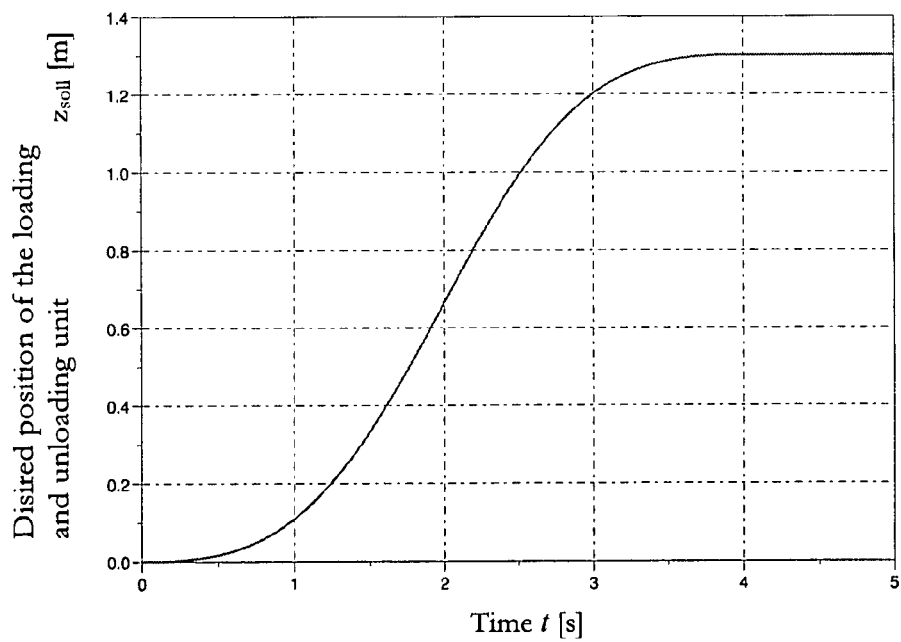

The loading and unloading device 9 is moved during the displacement between the start position and target position taking account of the mechanical and dynamic threshold values at the load handling device 2, such as mast deflection in the z-direction, mast base bending stress, always at the maximum speed, acceleration and maximum permissible positioning force $F_z$, as illustrated in FIG. 17. In other words, the loading and unloading device 9 is accelerated from the start position at a maximum positioning force $F_z$ limited by the threshold values and then accelerated and decelerated at a maximum negative positioning force $F_z$ limited by the threshold values. As a result, the loading and unloading device 9 is always moved at the maximum possible travel speed or acceleration, which permits a time-minimized positioning of the loading and unloading device 9 in the start and/or target position.

Figure 14:
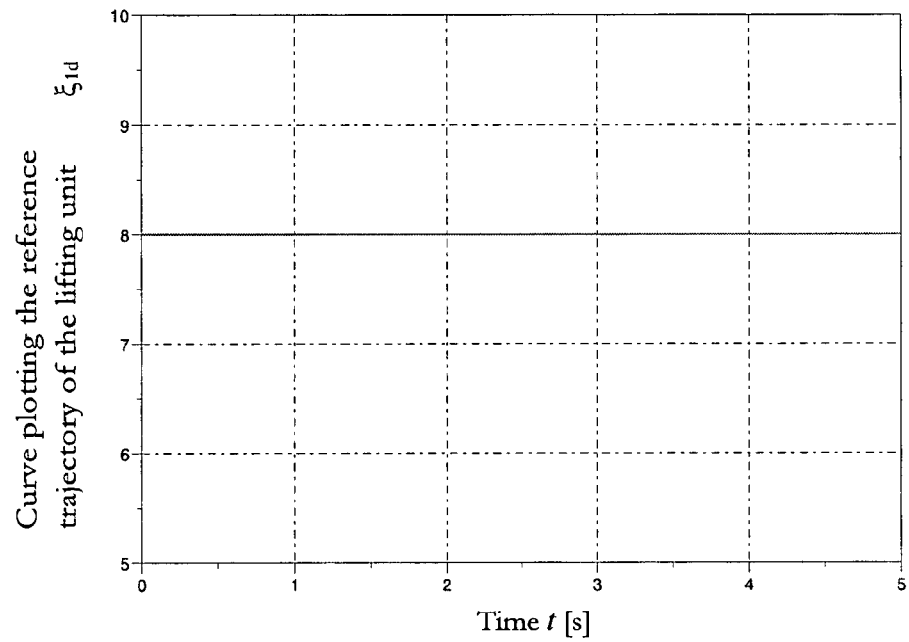
FIG. 14 is a diagram of the time curve of the first flat output serving as a reference trajectory of the loading and unloading device.
Figure 15:
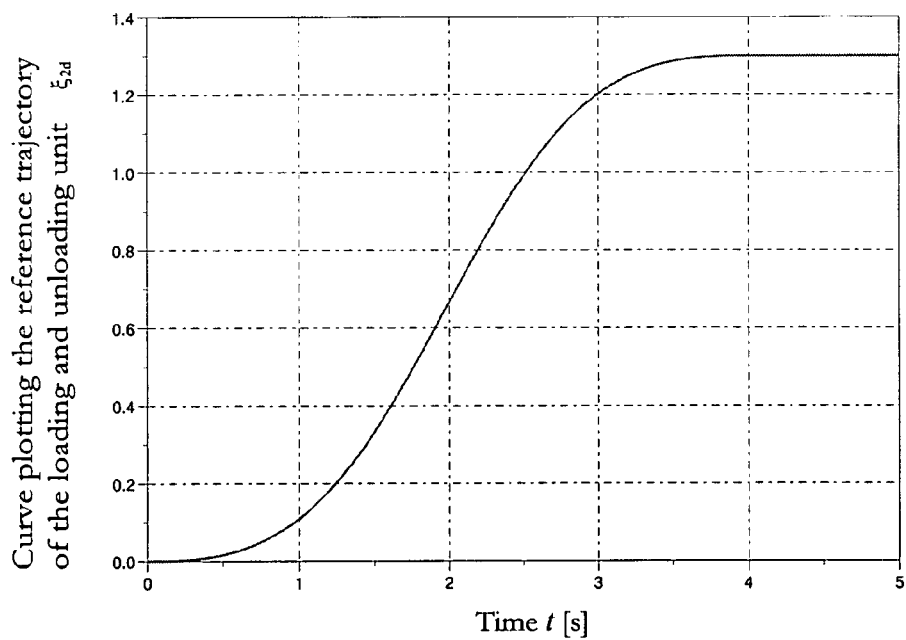
FIG. 15 is a diagram of the time curve of the second, flat output serving as a reference trajectory of the lifting unit of the load handling device.
Figure 16:
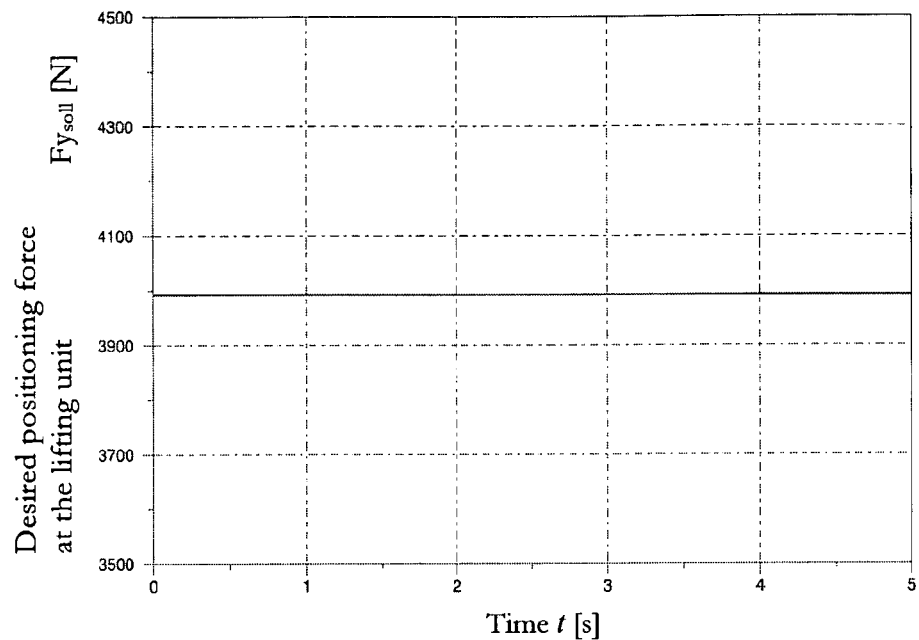

The planned reference trajectories illustrated in FIGS. 14 and 15 act on the load handling device 2 of this embodiment in such a way that during the transition from the maximum acceleration in the acceleration phase to a negative maximum acceleration in the deceleration phase, the mast 6 and the loading and unloading device 9 effect only a single vibration period in the z-direction from a negative bend to a positive bend and at the end of the deceleration phase, the mast deflection assumes a value of zero in the target position, and the loading and unloading device 9 is free of vibration and the freight object 10 is also positioned with a higher degree of accuracy. This is achieved due to the fact that the mast deflection in the z-direction and its velocity in the start and target positions are set to zero and the reference and desired trajectories are planned and calculated so that this condition is satisfied.

The positive effect achieved as a result is illustrated in FIG. 20. The curve plotted by a broken line represents the time curve of mast deflection in the z-direction of a load handling device 2 known from the prior art. The curve plotted by a solid line represents the time curve of mast deflection in the z-direction using the "flatness-based control".

If the loading and unloading device 9 is required to deposit a freight object 10 with a weight of approximately 1000 kilograms disposed on a pallet and move it from the start position $z(0)=0$ and $y(0=T_{end})=8$ m into the target position $z(T_{end})=1, 3$ m to deposit in the space remote from the aisle with a maximum acceleration or speed, the resulting time curve of bending or mast deflection in the z-direction is that illustrated in FIG. 20. The displacement time of the loading and unloading device 9 between the start and target positions corresponds to $T_{end}$ and is set at only 4 sec so that the threshold values of the load handling device 2 are complied with or there is only a slight drop below them in spite of the heavy weight to be manipulated.

FIG. 21 is a block diagram illustrating the position control system 22" for the load handling device 2 and the loading and unloading device 9 illustrated in FIGS. 1 and 12 incorporating it. The latter comprises the servo-control system 25" described above and a controller 63 connected to the control outputs 39" of the servo-control system 25" which receives the desired trajectories for at least the system variables, such as the desired positions $x_{soll}$, $y_{soll}$, $z_{soll}$ and desired mast bending $q_{xsoll}$, $q_{zsoll}$ in the x- and z-direction, from the servo-control system 25". At the control inputs 38", the servo-control system 25" receives the target positions $x_{end}$, $y_{end}$ and $z_{end}$ predefined by the master computer. The desired trajectories for the system variables of the desired positioning forces $F_{xsoll}$, $F_{ysoll}$, $F_{zsoll}$ are forwarded to the other control outputs 39" and applied to the position control circuit for the displacement and lifting unit 4, 8 and loading and unloading device 9. The time curve of the actual values of the system variables (actual trajectories) is detected on the basis of measurements taken by the distance measuring systems 23, 24, 59 and measuring sensors 45, 62 described above and forwarded to comparator elements, not illustrated, and correlated and calculated with the predefined desired trajectories of the system variables by means of these control variances which are applied to the controller 63. From the control variances between the desired and actual position $x_{soll}$, $y_{soll}$, $z_{soll}$, $x_{lst}$, $y_{lst}$, $z_{lst}$ and the desired bending and actual bending $q_{xsoll}$, $q_{zsoll}$, $q_{xlst}$, $q_{zlst}$, the controller 63 calculates the interference variables, in particular the differential forces $\Delta Fx$, $\Delta Fy$, $\Delta Fz$, on the basis of a fixed rule of law, which are then forwarded to a comparator element 42", 43", 61 connected downstream of the controller 63, compared with the desired positioning forces $F_{xsoll}$, $F_{ysoll}$, $F_{zsoll}$ and the desired positioning forces $F_{xsoll}$, $F_{ysoll}$, $F_{zsoll}$ are applied and the current positioning forces $F_x$, $F_y$, $F_z$ determined. The actuator members 29, 30, 56 receive the positioning forces $F_x$, $F_y$, $F_z$.

There is therefore an overall system by means of which all mathematical functions relating to the x-, y- and z-directions are derived in the servo-control system 25". To this end, the functions of the reference trajectories for the displacement and lifting unit 4, 8 as well as the loading and unloading device 9 are stored in the memory 35" and are read into the computer module 36" during operation of the load handling device 2 and loading and unloading device 9 and used to calculate the corresponding curves of the desired trajectories for the system variables, as explained above.

As described above, interference factors, such as mast stiffness, weight distribution, different friction conditions at the drive system due to fluctuations in the ambient conditions at the positioning point of the bay operating system or fluctuations in the current values at the displacement and lifting drives 7, 17 and such like, are not taken into account by the servo-control system 25; 25'; 25" and its mathematical model, which offers advantages in terms of processing the equation systems used to calculate the desired trajectories for the desired positioning forces $F_{xsoll}$, $F_{ysoll}$, $F_{zsoll}$, desired positions $x_{soll}$, $y_{soll}$, $z_{soll}$ and optionally desired bending $q_{xsoll}$, $q_{zsoll}$ in the shortest cycle times but can lead to variances from the desired trajectory, albeit very slight, which then have to be minimized by means of at least one controller 26, 27; 44; 60; 63.

However, it would be equally conceivable for the dynamic behavior, for example the dynamic deformations of the mast 6 in the x- and z-directions, to be detected during a reference movement of the load handling device 2 activated exclusively by the servo-control system 25; 25'; 25" using measuring sensors and at least one correction factor defined for the x- and/or y-direction on the basis of these measurement values, which is selected so that the interference factors are taken into account, thereby resulting in vibration-free positioning of the bay operating system, in particular the lifting unit 8, in the target positions. This correction factor is superimposed on the reference trajectories in order to calculate a corrected desired trajectory for the desired positioning forces $F_{xsoll}$, $F_{ysoll}$, $F_{xsoll}$, desired positions $x_{soll}$, $y_{soll}$, $z_{soll}$ and optionally the desired bending $q_{xsoll}$, $q_{zsoll}$. The advantage of these features is that they obviate the need for an additional controller for controlling the positioning operation and the associated vibration damping, significantly reducing the complexity of the circuitry and control of the load handling device 2. In this case, only the bay operating device would be controlled.

Although the option of calculating the reference trajectories with the aid of the mathematical model represents the preferred embodiment, it would also be conceivable for the reference trajectories to be determined experimentally. These empirically determined, predefined curves of the reference trajectories are then stored in the memories 35; 35'; 35" so that they are available for regulating or controlling the displacement and lifting unit 4, 8 as well as the loading and unloading device 9 along these trajectories.

FIG. 22 is a block diagram illustrating a so-called "flatness based control" for the load handling device 2 with the loading and unloading device 9. It comprises the servo-control system 25; 25'; 25", a controller 64, in particular a status controller, a first and a second computer module 65, 66. The status variables $x_{lst}$, $y_{lst}$, $z_{lst}$, $q_{xlst}$, $q_{zlst}$, $v_{xlst}$, $v_{ylst}$, $v_{zlst}$, $\dot{q}_{xlst}$, $\dot{q}_{zlst}$ denoted by $\bar{x}$ are detected by measuring systems or estimated by observers and the actual curves of reference trajectories (actual trajectories) are calculated in the computer module 66 from the actual values on the basis of $\bar{\xi}=\psi(\bar{x})$ and then forwarded to the controller 64. The desired curves of the flat outputs are also applied to the controller 64 as reference trajectories ξd. From the comparison between the desired curve of the reference trajectories and the actual curve of the reference trajectories, a respective control variance is calculated and applied to the computer module 65 at the inputs $v_1$, $v_2$, $v_3$. The computer module 65 contains mathematical equation systems by means of which the positioning variables $F_x$, $F_y$, $F_z$ are calculated from the actual values of the status variables $\bar{x}$ and input variables $v_1$, $v_2$, $v_3$, and which are forwarded to the actuator members of the displacement and lifting unit 4, 8 as well as the loading and unloading device 9. The mathematical equation systems in the form of differential equation systems are derived from the flat outputs in conjunction with the mathematical model for the bay operating device, as explained below.

In this respect, $$\vec{y} = \begin{pmatrix} x \\ y \\ z \\ q_x \\ q_z \end{pmatrix}$$

describes the output of the mathematical model of the bay operating system, $$\vec{x} = \begin{pmatrix} x \\ v_x \\ y \\ v_y \\ z \\ v_z \\ q_x \\ v_{q_x} \\ q_z \\ v_{q_z} \end{pmatrix}$$

describes the status vector, $$\vec{\xi} = \begin{pmatrix} \xi_{1x} \\ \xi_2 \\ \xi_{1z} \end{pmatrix}$$

describes the vector of the flat outputs and $$\vec{\xi}_d = \begin{pmatrix} \xi_{1xd} \\ \xi_{2d} \\ \xi_{1zd} \end{pmatrix}$$

describes the vector of the reference trajectories of the flat output, predefined during the planning operation of the servo-control system 25; 25'; 25". The variables of the status vector $\bar{x}$ may be determined on the basis of measurements or by an observer.

The mathematical model of the bay operating system may be described as follows $$\dot{\vec{x}} = f(\bar{x}, \bar{u})$$

$$\bar{y} = h(\bar{x}, \bar{u})$$

Since the property of flatness can be represented for this system, there exist variables $$\vec{\xi} = \begin{pmatrix} \xi_{1x} \\ \xi_2 \\ \xi_{1z} \end{pmatrix}$$

also referred to as flat outputs, which means that all the system variables ($\bar{x}$, $F_x$, $F_y$, $F_z$) can be described as functions of these variables and their time derivatives. By means of a status transformation in the form $$\bar{\xi} = \psi(\bar{x})$$

and a non-linear, dynamic status calculation which can be derived from it in the form $$\dot{\bar{\eta}} = \bar{f}(\bar{\eta}, \bar{x}, \bar{v})$$

$$\bar{u} = \bar{h}(\bar{\eta}, \bar{x}, \bar{v})$$

a new fictitious status $\bar{\eta}$ is obtained between the new input variables $$\vec{v} = \begin{pmatrix} v_1 \\ v_2 \\ v_3 \end{pmatrix}$$

and flat, linearizing output variables $$\vec{\xi} = \begin{pmatrix} \xi_{1x} \\ \xi_2 \\ \xi_{1z} \end{pmatrix}$$

to obtain a linear input and output behavior $$\xi_{1x}^{(n)} = v_1$$

$$\xi_2^{(m)} = v_2$$

$$\xi_{1z}^{(o)} = v_3$$

The term $\xi_{1x}^{(n)}$ stands for the n-th time derivative of $\xi_{1x}$. The same applies to $\xi_2^{(m)}$, $\xi_{1z}^{(o)}$. The non-linear dynamic status calculation is a calculated differential equation system which is used to transform the non-linear system behavior of the bay operating system between the input and output variables of the computer module 65 into a fictitious linear system. The linear system obtained in this manner can now be stabilized by means of linear controller maps. One option in this respect would be a linear status rule of law corresponding to a PD-controller in the form of $$v_{1x} = \xi_{1xd}^{(n)} - \sum_{j=0}^{n-1} a_j \left( \xi_{1x}^{(j)} - \xi_{1xd}^{(j)} \right)$$

$$v_2 = \xi_{2d}^{(m)} - \sum_{j=0}^{m-1} b_j \left( \xi_2^{(j)} - \xi_{2d}^{(j)} \right)$$

$$v_{1z} = \xi_{1zd}^{(o)} - \sum_{j=0}^{o-1} c_j \left( \xi_{1z}^{(j)} - \xi_{1zd}^{(j)} \right)$$

It is clear that, as with the PD-controller, the difference between the actual and reference trajectory is obtained and weighted with factors $a_j$, $b_j$ and $c_j$ in order to correct the new inputs $v_1$, $v_2$ und $v_3$.

Accordingly, it is not the desired trajectories of the system variables that are stabilized directly but the reference trajectories of the flat output in the transformed system. When the flat output moves along the reference trajectories, the system variables also move along their desired trajectories.

Although the bay operating device illustrated in FIGS. 1 and 12 has only one mast 6 secured to the displacement units 4, 20, this should not be construed as restricting the invention in any way. In effect, the method proposed by the invention and the position control system 22; 22'; 22" proposed by the invention may also be used in conjunction with a bay operating device of the type which has a double mast connecting a bottom displacement unit and a top displacement unit to one another. The bay operating device is guided by means of the bottom and top displacement units along guide tracks, in particular rails, for which purpose the bottom displacement unit is provided with the vertical and lateral guide rollers illustrated in FIG. 1, whilst the top displacement unit is provided exclusively with the lateral guide rollers illustrated in FIG. 1. The lifting unit with the loading and unloading device and the freight object are disposed inside the double mast. Such bay operating systems have long been known and are described in patent specification DE 195 34 291 A1, for example. The damping drive on the top displacement unit described in this publication can be dispensed with if using "flatness based control/automatic control". This results in a considerable saving in the cost of manufacturing and operating the bay operating system.

Rather than pre-calculating or predefining the reference trajectories, another option is to calculate them using the mathematical model of the servo-control system 25; 25'; 25", in particular the computer modules 36; 36'; 36" during operation of the load handling device 2 and loading and unloading device 9 in real time.

The reference trajectories can be optimized by taking account of different loads, lifting heights and geometries, different dynamic behavior due to different structural designs, different drives and the way in which force is transmitted as well as different static and dynamic deformations of the mast 6. An optimized reference trajectory is defined for every type of load handling device 2 and loading and unloading device 9.

As a result of the method described above, load handling devices 2 which are of the same design or same structure but are used for different purposes may exhibit a different dynamic behavior. For example, it may be necessary for the threshold values of the load handling device 2 to be selected differently. For example, there may be a situation in which the load handling device 2 or loading and unloading device 9 has to be moved at higher acceleration values than in another situation. However, the effect on the dynamic behavior of the load handling devices 2 is always the same. In other words, the mast deflection in the x- and/or z-directions induced by acceleration and deceleration is eliminated in a controlled manner by predefining its desired trajectory to the point at which the load handling device 2 or loading and unloading device 9 is stationary using the reference trajectories. The reference trajectories are planned so that the mast deflection q and its velocity q in the start and target positions assumes a value of zero. Consequently, the mast 6 is subjected to a negative bending once only and a positive bending once only. Uncontrolled vibration of the mast 6 between the start and target positions and in the start and target positions is effectively prevented.

Although the method and position control system 22; 22'; 22" proposed by the invention are described on the basis of a particular bay operating device, it would be equally possible to use a different embodiment of a load handling device whereby the platform accommodating the freight object can be moved in the x- and/or y- and/or z-directions. For example, the load handling device may also be provided in the form of a carriage, an elevator or similar, in other words a conveyor system.

Finally, it should also be pointed out that the differential forces and desired trajectories usually predefine the time curve of the control signals in the form of control voltage, motor current and speed change at the displacement, lifting and actuator drives 7, 17, 55. This being the case, the motor current or driving torque needed at the displacement, lifting and actuator drive 7, 17, 55 is known at every instant of the travel of the bay operating system and the loading and unloading device 9 between a start and target position because the desired trajectories are predefined. By desired trajectories is meant the time curve of the system variables, such as the desired positioning forces $F_{xsoll}$, $F_{ysoll}$, $F_{zsoll}$, desired positions $x_{soll}$, $y_{soll}$, $z_{soll}$, desired mast bending $q_{xsoll}$, $q_{zsoll}$ and desired velocities $v_{xsoll}$, $v_{ysoll}$, $v_{zsoll}$, $\dot{q}_{xlst}$, $\dot{q}_{zlst}$, thereof.

The embodiments illustrated as examples represent possible design variants of the method and position control system, and it should be pointed out at this stage that the invention is not specifically limited to the design variants specifically illustrated, and instead the individual design variants may be used in different combinations with one another and these possible variations lie within the reach of the person skilled in this technical field given the disclosed technical teaching. Accordingly, all conceivable design variants which can be obtained by combining individual details of the design variants described and illustrated are possible and fall within the scope of the invention.

For the sake of good order, finally, it should be pointed out that, in order to provide a clearer understanding of the high-bay racking system, it and its constituent parts are illustrated to a certain extent out of scale and/or on an enlarged scale and/or on a reduced scale.

LIST OF REFERENCE NUMBERS

| | |
|---|---|
| 1 | Guide track |
| 2 | Load handling device |
| 3 | High-bay rack |
| 4 | Displacement unit |
| 5 | Bracket |
| 6 | Mast |
| 7 | Lift drive |
| 8 | Lifting unit |
| 9 | Loading and unloading device |
| 10 | Freight object |
| 11 | Rack compartment |
| 12 | Guide system |
| 13 | Guide track |
| 14 | Vertical guide roller |
| 15 | Lateral guide roller |
| 16 | Fixing clamp |
| 17 | Displacement drive |
| 18 | Drive element |
| 19 | Driving gear |
| 20 | Displacement unit |
| 21 | Pulley wheel |

-continued

| | |
|---|---|
| 22 | Position control system |
| 22' | Position control system |
| 22" | Position control system |
| 23 | Distance measuring system |
| 24 | Distance measuring system |
| 25 | Servo-control system |
| 25' | Servo-control system |
| 25" | Servo-control system |
| 26 | Position controller |
| 27 | Position controller |
| 28 | Switch cabinet |
| 29 | Actuator member |
| 30 | Actuator member |
| 31 | Lateral guide roller |
| 32 | Guide track |
| 35 | Memory |
| 35' | Memory |
| 35" | Memory |
| 36 | Computer module |
| 36' | Computer module |
| 36" | Computer module |
| 37 | Logic system |
| 37' | Logic system |
| 37" | Logic system |
| 38 | Control input |
| 38' | Control input |
| 38" | Control input |
| 39 | Control output |
| 39' | Control output |
| 39" | Control output |
| 40 | Comparator element |
| 41 | Comparator element |
| 42 | Comparator element |
| 42' | Comparator element |
| 42" | Comparator element |
| 43 | Comparator element |
| 43' | Comparator element |
| 43" | Comparator element |
| 44 | Controller |
| 45 | Measuring sensor |
| 46 | Telescopic arm |
| 47 | Support frame |
| 48 | Middle slide |
| 49 | Top slide |
| 50 | Drive means |
| 51a | Drive element |
| 51b | Drive element |
| 51c | Drive element |
| 52 | Drive element |
| 53 | Driving gear |
| 54 | Output gear |
| 55 | Actuator drive |
| 56 | Actuator member |
| 60 | Controller |
| 61 | Comparator element |
| 62 | Measuring sensor |
| 63 | Controller |
| 64 | Controller |
| 65 | Computer module |
| 66 | Computer module |

The invention claimed is:

1. A method of controlling the movement of a load handling device using a flatness based control system, wherein the load handling device comprises a displacement unit displaceable by a displacement electrical drive, a vertical mast attached on the displacement unit and a lifting unit arranged on the vertical mast and vertically displaceable by a lifting electrical drive, wherein the method comprises the steps of:
 a) defining reference trajectories for the displacement unit and the lifting unit, wherein the reference trajectories are optimized with respect to maximum permissible mechanical and dynamic stress appearing on the vertical mast and on the electrical drives as well as with respect to a time-minimized operating displacement of the load handling device during operation between a start position and a target position, wherein the reference trajectories are adapted to system behavior of the load handling device in such a way that a permissible deformation of the vertical mast during operation of the load handling device between the starting and target positions is predefined at least by one mechanical threshold value, and a mast deflection is equal to zero when the load handling device is in the target position,
 b) calculating desired trajectories at least for desired positioning forces of the displacement and lifting units based on the reference trajectories, wherein the displacement and lifting units receive the desired positioning forces in time cycles; and
 c) controlling movement of the displacement and lifting units along the desired trajectories in such a way that the target position of the displacement and lifting units is reached largely free of vibration by an end of movement of the electrical drives.

2. The method according to claim 1, wherein the reference trajectories optimized for the system behavior of the load handling device are used to calculate other desired trajectories for system variables.

3. The method according to claim 1, wherein the desired trajectories are calculated on a basis of mathematical equations based on a principle of a flatness-based control, wherein flat outputs of positioning forces of the displacement and lifting units describe a calculation variable for the system behavior of the load handling device, wherein time curves of the flat outputs correspond to the reference trajectories optimized for the system behavior of the load handling device, and wherein the reference trajectories optimized for the system behavior of the load handling device are used to calculate the desired trajectories on the basis of the mathematical equations.

4. The method according to claim 1, wherein variances between a curve of each calculated desired trajectory of the desired trajectories and a time curve of respective detected actual values of are corrected via at least one controller.

5. The method according to claim 1, wherein a controller receives a control variance calculated from a desired-actual comparison of a desired trajectory for a desired position and/or a desired velocity and a time curve for an actual position and/or an actual velocity of the displacement and lifting units,
 wherein differential forces are calculated by the controller on a basis of a control algorithm and are imposed on the desired trajectories for the desired positioning forces, and
 wherein actuator members of the displacement and lifting drives receive desired positioning forces corrected by the differential forces.

6. The method according to claim 1, wherein the one mechanical threshold value is detected on a basis of mechanical and dynamic loads on the mast during the operating travel as a system variable, and
 wherein actual values of the mechanical and dynamic loads on the mast during the operating travel are forwarded to a controller.

7. The method according to claim 1, wherein control variances are determined in a controller between a desired curve of each calculated reference trajectory and an actual curve of each measured positioning force of the displacement and lifting units,
 wherein the control variances are forwarded to a computer module as input variables,
 wherein the computer module works out a linear system behavior via mathematical equations between the input variables and output variables and calculates positioning forces for the displacement and lifting units from the input variables and each measured positioning force of the displacement and lifting units, and wherein the positioning forces for the displacement and lifting units are forwarded to actuator members of the displacement and lifting drives.

8. The method according to claim 1, wherein a first reference trajectory of the reference trajectories optimized for the system behavior of the load handling device is best suited to mechanical and/or dynamic loads of the load handling device and/or a structural design of the load handling device, and wherein the first reference trajectory is selected via a selection device by a user from a list of set reference trajectories.

9. The method according to claim 1, wherein correction factors are determined with respect to mechanical and/or dynamic loads of the load handling device and/or a structural design of the load handling device, wherein a correction factor of the correction factors is respectively selected for the displacement and lifting unit via a selection device by a user from a list of set correction factors, and wherein the list is superimposed on the reference trajectories optimized for the system behavior of the load handling device.

10. The method according to claim 1, wherein the reference trajectories optimized for the system behavior of the load handling device are stored in a memory as a function of the start and target positions as well as of values of the maximum permissible mechanical and dynamic loads and are read into a a microprocessor of a computer module during operation of the load handling device, and wherein the desired trajectories are calculated by detecting the start position and predefining the target position of the displacement and lifting units on a basis of the reference trajectories optimized for the system behavior of the load handling device.

11. A load handling device in a high-bay racking system, the load handling device comprising:

a displacement unit displaceable by a displacement electrical drive, a vertical mast attached on the displacement unit, a lifting unit arranged on the vertical mast and vertically displaceable by a lifting electrical drive, a loading and unloading device arranged on the lifting unit for manipulating a freight object, and a position control system for the load handling device, the position control system having:

at least one controller, a master computer connected to the at least one controller, a flatness-based servo-control system with a computer module and a memory connected to the computer module, and a logic system, wherein the computer module is connected via control inputs to the master computer, and via control outputs to actuator members of the displacement and lifting electrical drives, wherein the position control system can activate the displacement unit displaceable by the displacement electrical drive and the lifting unit vertically displaceable on the vertical mast by the lifting electrical drive, wherein the memory can store reference trajectories for at least the displacement and lifting units, the reference trajectories being optimized with respect to maximum permissible mechanical and dynamic stress appearing on the vertical mast and on the electrical drives and with respect to a time-minimized operating displacement of the load handling device during operation between a start position and a target position, wherein the logic system is able to calculate desired trajectories for desired positioning forces of the displacement and lifting units from the reference trajectories optimized for the system behavior of the load handling device on a basis of mathematical equations, and wherein the control outputs can be connected to actuator members of the displacement and lifting electrical drives so that the actuator members can receive positioning variables determined from the desired trajectories so that target positions are reached largely free of vibration.

12. A method of controlling the movement of a load handling device using a flatness based control system, wherein the load handling device comprises a displacement unit displaceable by a displacement drive, a vertical mast attached on the displacement unit, a lifting unit arranged on the vertical mast and vertically displaceable by a lifting drive and a loading and unloading device arranged on the lifting unit for manipulating a freight object, wherein the method comprises the steps of:

a) defining at least one reference trajectory, wherein the reference trajectory is optimized with respect to maximum permissible mechanical and dynamic stress appearing on the load handling device as well as with respect to a time-minimized displacement of the loading and unloading device for manipulating the freight object between a start position and a target position, wherein the reference trajectory is adapted to system behavior of the load handling device in such a way that a permissible deformation of the vertical mast during operation of the loading and unloading device manipulating between the start and target positions is predefined by at least one mechanical threshold value, and the mast deflection is equal to zero when the loading and unloading device is in the target position, b) calculating at least one desired trajectory at least for a desired positioning force of the loading and unloading device based on the reference trajectory optimized with respect to the system behavior of the load handling device and the time-minimized displacement of the loading and unloading device, and wherein an actuator drive of the loading and unloading device receives the desired positioning force in time cycles and c) controlling movement of the actuator along the at least one desired trajectory in such a way that the target position of the loading and unloading device is reached largely free of vibration by an end of movement of the actuator drive.

13. The method according to claim 12, wherein other desired trajectories for system variables are calculated on a basis of other reference trajectories optimized for the system behavior of the load handling device.

14. The method according to claim 12, wherein the at least one desired trajectory is calculated on a basis of mathematical equations in accordance with a principle of a flatness-based control, wherein a flat output of a positioning force of the loading and unloading device describes a calculation variable for the system behavior of the load handling device, and wherein time curves of the flat outputs correspond to the reference trajectory optimized for the system behavior of the load handling device and are used to calculate the at least one desired trajectory on a basis of mathematical equations.

15. The method according to claim 12, wherein variances between a curve of the at least one desired trajectory and a time curve of each detected actual value of positioning forces of the loading and unloading device are corrected via at least one controller.

16. The method according to claim 12, wherein a controller receives a control variance calculated from a desired-actual comparison of a desired trajectory for a desired position and/or a desired velocity and a time curve for an actual position and/or an actual velocity of the loading and unloading device,
wherein a differential force is calculated by the controller on a basis of a control algorithm and is superimposed on the at least one desired trajectory, and
wherein an actuator member of the loading and unloading device receives a desired positioning force corrected by the differential force.

17. The method according to claim 12, wherein the at least one mechanical threshold value is detected on a basis of mechanical and dynamic loads on the mast and/or of the loading and unloading device during operation to provide a system variable, and
wherein actual values of the mechanical and dynamic loads on the mast and/or of the loading and unloading device during operation are forwarded to a controller.

18. The method according to claim 12, wherein a control variance is determined in a controller between a desired curve of the reference trajectory optimized for the system behavior of the load handling device and an actual curve calculated from a measured positioning force of the loading and unloading device,
wherein the control variance is forwarded to a computer module as an input variable,
wherein the computer module works out a linear system behavior via mathematical equations between the input variable and an output variable and calculates a positioning force of the loading and unloading device from the input variable and the measured positioning force of the loading and unloading device, and
wherein the positioning force of the loading and unloading device is forwarded to an actuator member of the loading and unloading device.

19. The method according to claim 12, wherein several reference trajectories are set for the loading and unloading device,
wherein a first reference trajectory of the several reference trajectories is best adapted to mechanical and/or dynamic loads of the load handling device and/or loading and unloading device and/or to a structural design of the load handling device and/or loading and unloading device, and
wherein the first reference trajectory is selected via a selection device by a user from a list of set reference trajectories.

20. The method according to claim 12, wherein one reference trajectory only is set for the loading and unloading device,
wherein correction factors best adapted to mechanical and/or dynamic loads and/or a structural design of the load handling device and/or loading and unloading device are determined, and
wherein a correction factor of the correction factors is selected for the loading and unloading device via a selection device by a user from a list of set correction factors and is superimposed on the one reference trajectory set for the loading and unloading device.

21. The method according to claim 12, wherein the reference trajectory optimized for the system behavior of the load handling device is stored in a memory as a function of the start and target positions as well as of values of the maximum permissible mechanical and dynamic loads and is read into a computer module comprising a microprocessor during operation of the load handling device, and
wherein the at least one desired trajectory is calculated by detecting the start position and predefining the target position of the loading and unloading device on a basis of a reference trajectory for the loading and unloading device.

22. A load handling device in a high-bay racking system, wherein the load handling device comprises:
a displacement unit displaceable by a displacement drive,
a vertical mast attached on the displacement unit,
a lifting unit arranged on the vertical mast and vertically displaceable by a lifting drive,
a loading and unloading device arranged on the lifting unit for manipulating a freight object, and
a position control system for the load handling device, the position control system having:
at least one controller,
a master computer connected to the at least one controller,
a flatness-based servo-control system with a computer module, and a memory connected to the computer module, and a logic system,
wherein the computer module is connected via control inputs to the master computer, and via control outputs to actuator members of the displacement and lifting drives,
wherein the position control system can activate the displacement unit displaceable by the displacement drive, the lifting unit vertically displaceable on the vertical mast by the lifting drive as well as the loading and unloading device for manipulating a freight object,
wherein the memory can store at least one reference trajectory optimized with respect to maximum permissible mechanical and dynamic stress appearing on the load handling device and with respect to a time-minimized operating displacement of the loading and unloading device manipulating the freight object between a start position and a target position,
wherein the logic system can calculate a desired trajectory for a desired actuating force of the loading and unloading device from the reference trajectory optimized with respect to the system behavior of the load handling device and the time-minimized displacement of the loading and unloading device on a basis of mathematical equations, and
wherein the control outputs can be connected to an actuator member of the loading and unloading device so that the actuator member can receive a positioning variable determined from the desired trajectory in order to reach a target position largely free of vibration.

* * * * *